United States Patent
Bhattacharjee et al.

(10) Patent No.: US 9,268,804 B2
(45) Date of Patent: *Feb. 23, 2016

(54) MANAGING A MULTI-VERSION DATABASE

(71) Applicant: International Business Machines Corporation, Armonk, NY (US)

(72) Inventors: Bishwaranjan Bhattacharjee, Yorktown Heights, NY (US); Mustafa Canim, Ossining, NY (US); Mohammad Sadoghi Hamedani, White Plains, NY (US); Kenneth A. Ross, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 273 days.

This patent is subject to a terminal disclaimer.

(21) Appl. No.: 13/969,537

(22) Filed: Aug. 17, 2013

(65) Prior Publication Data

US 2014/0358861 A1    Dec. 4, 2014

Related U.S. Application Data

(63) Continuation of application No. 13/904,219, filed on May 29, 2013.

(51) Int. Cl.
G06F 17/30 (2006.01)

(52) U.S. Cl.
CPC ...... *G06F 17/30309* (2013.01); *G06F 17/3023* (2013.01)

(58) Field of Classification Search
CPC .................. G06F 17/3023; G06F 17/30309
USPC ........................................................ 707/638
See application file for complete search history.

(56) References Cited

U.S. PATENT DOCUMENTS 7,194,492 B2 * 3/2007 Seidenberg et al. ... 707/999.204
7,685,181 B2   3/2010 Bhattacharjee et al.
(Continued)

FOREIGN PATENT DOCUMENTS

| CN | 101770515 A | 7/2010 |
| WO | 2004025519 A2 | 3/2004 |
| WO | 2010067119 A1 | 6/2010 |

OTHER PUBLICATIONS

Athanassoulis et al., "MaSM: efficient online updates in data warehouses", SIGMOD Conference 2011, Jun. 2011, pp. 865-876.
(Continued)

*Primary Examiner* — Vincent F Boccio
(74) *Attorney, Agent, or Firm* — Yee & Associates, P.C.; Nidhi Garg

(57) ABSTRACT

Managing different versions of a data record is provided. A mapping is maintained between a version-independent logical record identifier and a version-dependent physical record row identifier that correspond to each data record within a plurality of data records of a data table using a logical record identifier to physical record row identifier indirection mapping table. Entries within leaf pages of an index associated with the data table are updated to point to the version-independent logical record identifier corresponding to a data record instead of pointing to the version-dependent physical record row identifier corresponding to the data record. The logical record identifier to physical record row identifier indirection mapping table is updated in response to performing an operation on the data record instead of updating the entries within the leaf pages of the index associated with the data table.

16 Claims, 19 Drawing Sheets

(56) References Cited

U.S. PATENT DOCUMENTS

| | | | |
|---|---|---|---|
| 8,145,940 B1* | 3/2012 | Wang et al. | 714/6.1 |
| 8,161,015 B2 | 4/2012 | Kennedy et al. | |
| 9,026,747 B2* | 5/2015 | Wang et al. | 711/150 |
| 2007/0078909 A1 | 4/2007 | Tamatsu | |
| 2008/0208802 A1 | 8/2008 | Bhattacharjee et al. | |
| 2008/0228795 A1 | 9/2008 | Lomet | |
| 2009/0210428 A1 | 8/2009 | Cooper et al. | |
| 2011/0035359 A1 | 2/2011 | Bendakovsky et al. | |
| 2011/0106775 A1 | 5/2011 | Arbo et al. | |
| 2014/0052912 A1* | 2/2014 | Wang et al. | 711/118 |
| 2014/0358876 A1 | 12/2014 | Bhattacharjee et al. | |

OTHER PUBLICATIONS

Severance et al., "Differential files: their application to the maintenance of large databases", Journal ACM Transactions on Database Systems (TODS) TODS Homepage archive vol. 1 Issue 3, Sep. 1976, pp. 256-267.

Hanssen; "Concurrency control in distributed geographical database systems"; Jul. 2004; Department of Mapping Sciences, Agricultural University of Norway, 14 pages.

Agrawal et al., "Lazy-adaptive tree: An optimized index structure for flash devices", Proceedings of the VLDB Endowment 2.1, Aug. 2009, pp. 361-372.

Bhattacharjee et al., "Efficient bulk deletes for multi dimensional clustered tables in DB2", Proceedings of the 33rd international conference on Very large data bases, VLDB Endowment, Sep. 2007, pp. 1197-1206.

Bhattacharjee et al., "Enhancing recovery using an SSD buffer pool extension" Proceedings of the Seventh International Workshop on Data Management on New Hardware, ACM, Jun. 2011, pp. 10-16.

Canim et al. "An object placement advisor for DB2 using solid state storage", Proceedings of the VLDB Endowment 2.2, Aug. 2009, pp. 1318-1329.

Canim et al. "SSD bufferpool extensions for database systems." Proceedings of the VLDB Endowment 3.1-2 Sep. 2010, pp. 1435-1446.

Chen et al., "CAFTL: A content-aware flash translation layer enhancing the lifespan of flash memory based solid state drives", Proceedings of the 9th USENIX conference on File and storage technologies, USENIX Association, Feb. 2011, pp. 77-90.

Do et al. "Turbocharging DBMS buffer pool using SSDs", Proceedings of the 2011 international conference on Management of data, ACM, Jun. 2011, pp. 1113-1124.

Hitz et al., "File system design for an NFS file server appliance", Proceedings of the USENIX Winter 1994 Technical Conference, Jan. 1994, 23 pages.

Kang et al., "Flash-based extended cache for higher throughput and faster recovery", Proceedings of the VLDB Endowment 5.11, Jul. 2012, pp. 1615-1626.

Levandoski et al., "The Bw-Tree: A B-tree for New Hardware Platforms", Proceedings of the 2013 IEEE 29th International Conference on Data Engineering, Apr. 2013, 12 pages.

Li et al., "Tree indexing on flash disks", Proceedings of the 2009 IEEE International Conference on Data Engineering, Mar.-Apr. 2009, pp. 1303-1306.

Lomet et al., "Immortal DB: transaction time support for SQL server", Proceedings of the 2005 ACM SIGMOD international conference on Management of data, Jun. 2005, pp. 939-941.

Lomet et al., "Transaction time indexing with version compression", Proceedings of the VLDB Endowment, Aug. 2008, pp. 870-881.

Omiecinski et al., "Analysis of a deferred and incremental update strategy for secondary indexes." Information Systems, vol. 16, Issue 3, Feb. 1991, pp. 345-356.

O'Neil et al., "The log-structured merge-tree (LSM-tree)", Acta Informatica vol. 33, Issue 4, Jun. 1996, pp. 351-385.

Rosenblum et al., "The design and implementation of a log-structured file system" ACM Transactions on Computer Systems (TOCS), vol. 10, Issue 1, Feb. 1992, pp. 26-52.

Sears et al., "bLSM: a general purpose log structured merge tree". Proceedings of the 2012 international conference on Management of Data, May 2012, pp. 217-228.

Vo et al., "LogBase: A Scalable Log-structured Database System in the Cloud", Proceedings of the VLDB Endowment, vol. 5, No. 10, Jun. 2012, pp. 1004-1015.

Wu et al., "An efficient B-tree layer for flash-memory storage systems", 9th International Conference Real-Time and Embedded Computing Systems and Applications, Feb. 2003, pp. 409-430.

Notice of Allowance, dated Jun. 22, 2015, regarding U.S. Appl. No. 13/904,537, 19 pages.

\* cited by examiner

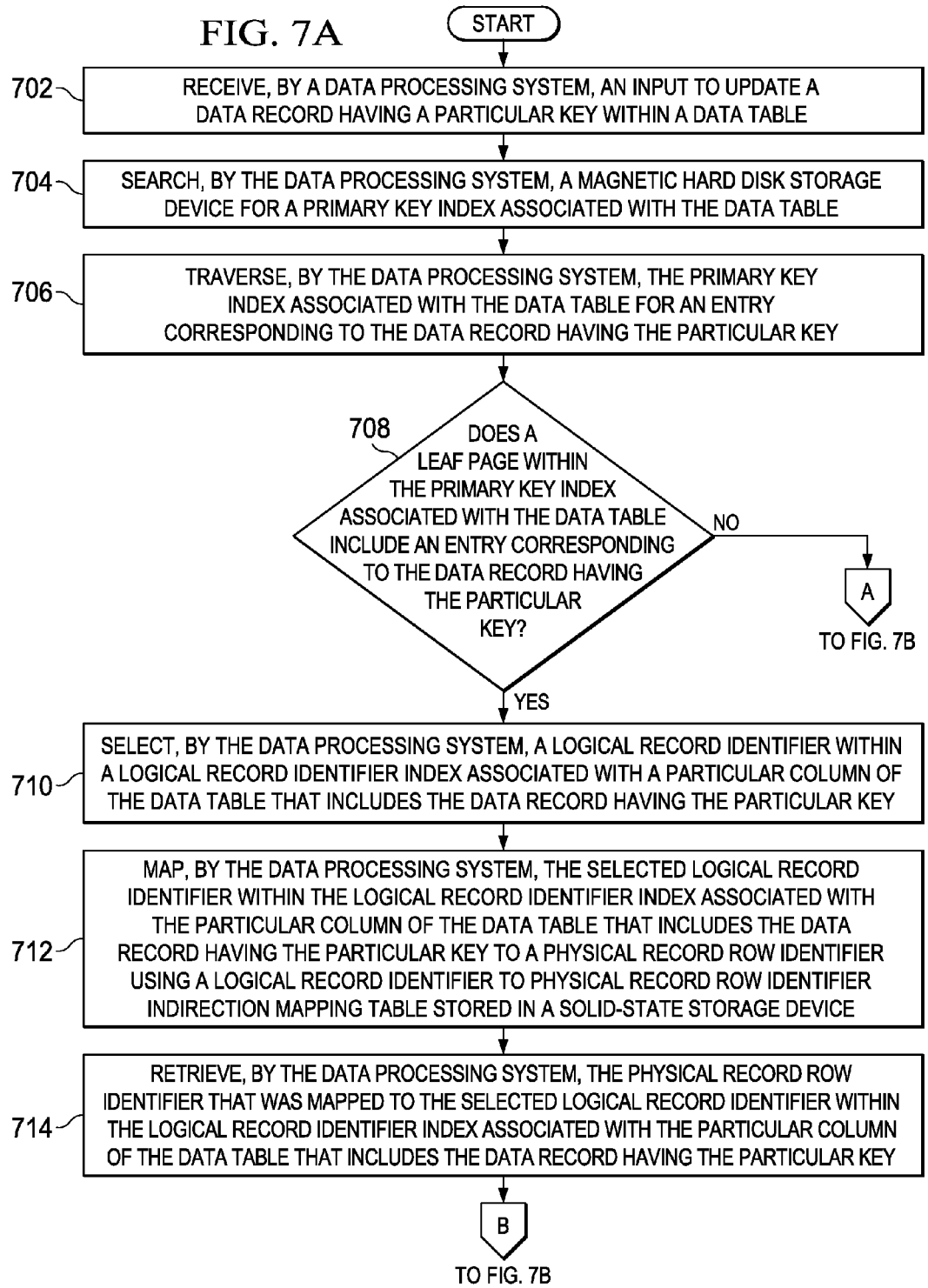

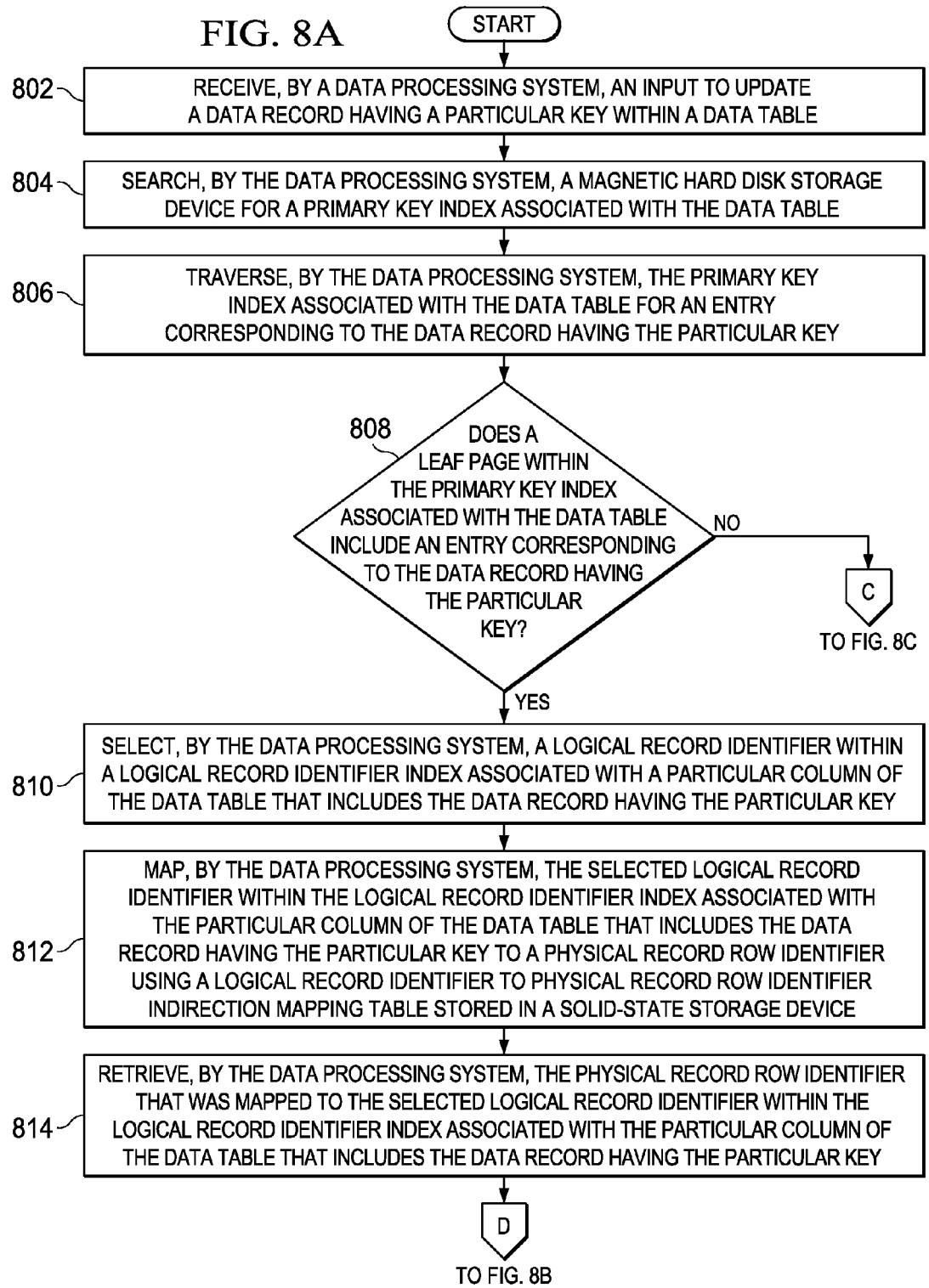

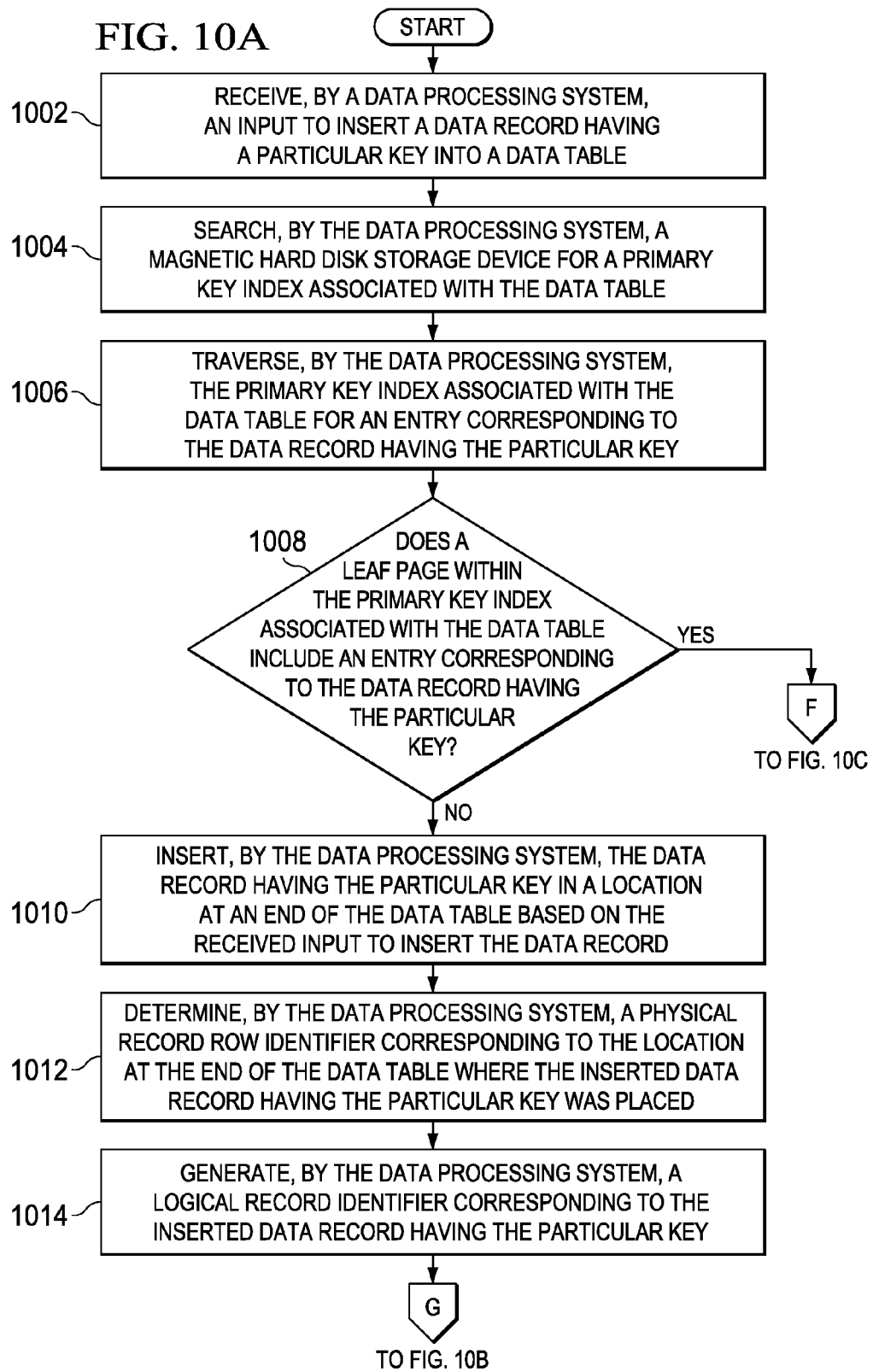

MANAGING A MULTI-VERSION DATABASE

This application is a continuation of U.S. patent application Ser. No. 13/904,219 filed on May 29, 2013.

BACKGROUND

1. Field

The disclosure relates generally to managing a multi-version database and more specifically to increasing the speed of insert, update, and delete operations of data records stored within the multi-version database.

2. Description of the Related Art

A multi-version database stores both current data records and historical data records in rows of a relational data table. The rows are typically annotated with timestamps representing the time period during which a row is valid or was valid. In a multi-version database system, new data records do not physically replace old ones. Instead, a new version of a data record is generated, which becomes visible to other transactions at commit time. Conceptually, many rows for a data record may exist, each row corresponding to a state of the multi-version database at some point in time. Very old versions may be garbage-collected as the need for old data records diminishes, in order to reclaim space for new data records.

In a multi-version database, updates and deletions of data records require appending a new data record into the data table rather than performing in-row updates. These operations incur non-negligible performance overhead when multiple indexes on the data table exist and the record changes need to be propagated to these indexes. In a conventional multi-version database, performing a delete operation on a data record requires marking of the row's entry in each of the existing indexes. Any update that changes only one attribute of a data record causes a new version of the row, which needs to be propagated to all of the existing indexes. Hence, index updates will be unavoidable for these operations.

SUMMARY

According to one illustrative embodiment, a data processing system for managing different versions of a data record is provided. A mapping is maintained between a version-independent logical record identifier and a version-dependent physical record row identifier that correspond to each data record within a plurality of data records of a data table using a logical record identifier to physical record row identifier indirection mapping table. Entries within leaf pages of an index associated with the data table are updated to point to the version-independent logical record identifier corresponding to a data record instead of pointing to the version-dependent physical record row identifier corresponding to the data record. The logical record identifier to physical record row identifier indirection mapping table is updated in response to performing an operation on the data record instead of updating the entries within the leaf pages of the index associated with the data table. According to another illustrative embodiment, a computer program product for managing different versions of a data record also is provided.

BRIEF DESCRIPTION OF THE SEVERAL VIEWS OF THE DRAWINGS

FIGS. 7A and 7B are a flowchart illustrating a process for updating data records in a relational data table using an indirection mapping table in accordance with an illustrative embodiment;

FIGS. 8A-8C are a flowchart illustrating a process for updating data records in a relational data table using an indirection mapping table and blocks of batched logical record identifiers in accordance with an illustrative embodiment;

FIGS. 10A-10C are a flowchart illustrating a process for inserting data records in a relational data table using an indirection mapping table and blocks of batched logical record identifiers in accordance with an illustrative embodiment;

DETAILED DESCRIPTION

Figure 1:
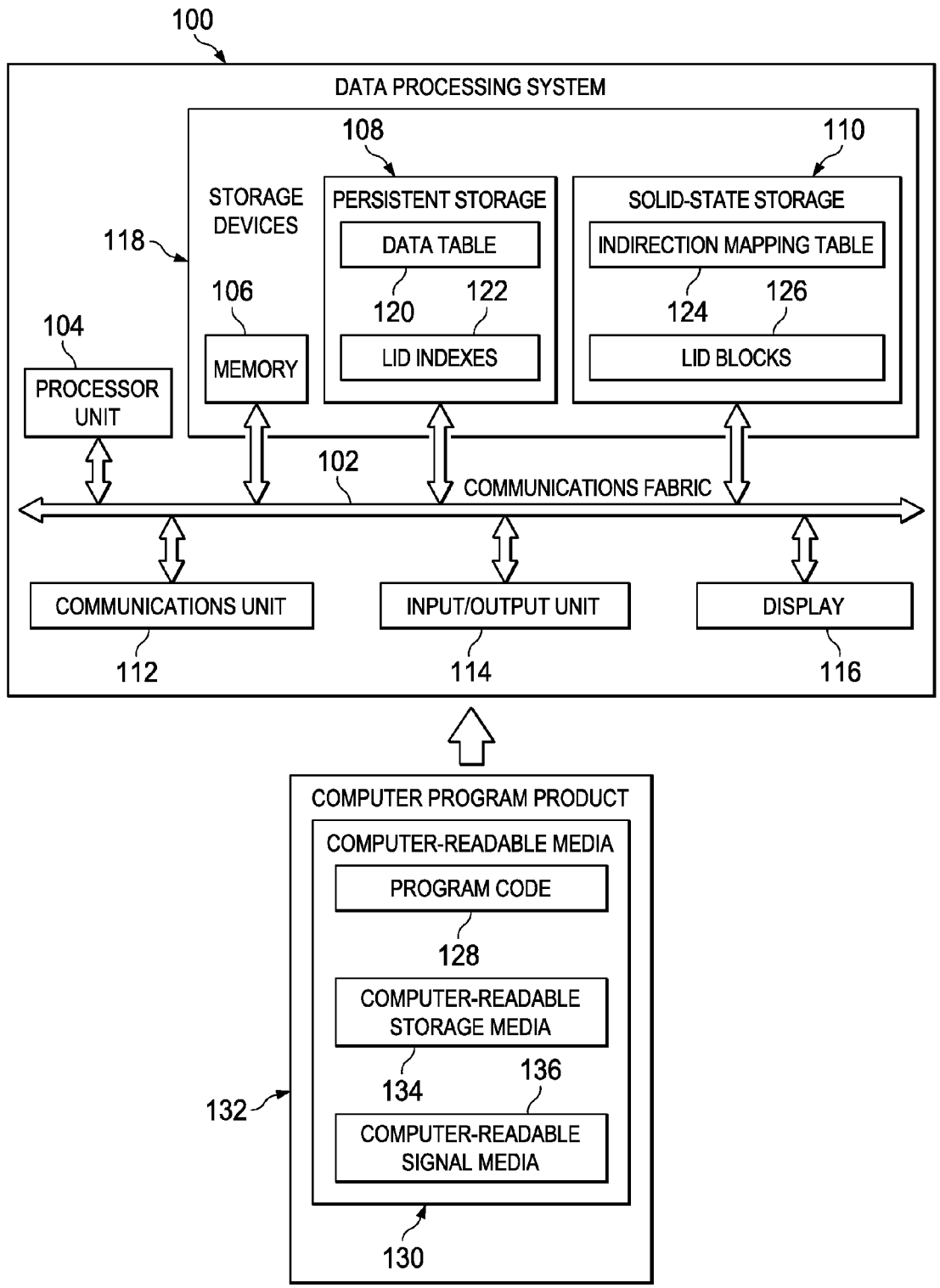
FIG. 1 is a diagram of a data processing system in which illustrative embodiments may be implemented.

As will be appreciated by one skilled in the art, aspects of the illustrative embodiments may be embodied as a data processing system or computer program product. Accordingly, aspects of the illustrative embodiments may take the form of an entirely hardware embodiment, an entirely software embodiment (including firmware, resident software, microcode, etc.), or an embodiment combining software and hardware aspects that may all generally be referred to herein as a "circuit," "module," or "system." Furthermore, aspects of the illustrative embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can store a program for use by or in connection with an instruction execution system, apparatus, or device. In addition, a computer readable storage medium does not include a propagation medium, such as a signal or carrier wave.

A computer readable signal medium may include a propagated data signal with computer readable program code embodied therein, for example, in baseband or as part of a carrier wave. Such a propagated signal may take any of a variety of forms, including, but not limited to, electro-magnetic, infra-red, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described below with reference to flowchart illustrations and/or block diagrams of data processing systems and computer program products according to illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
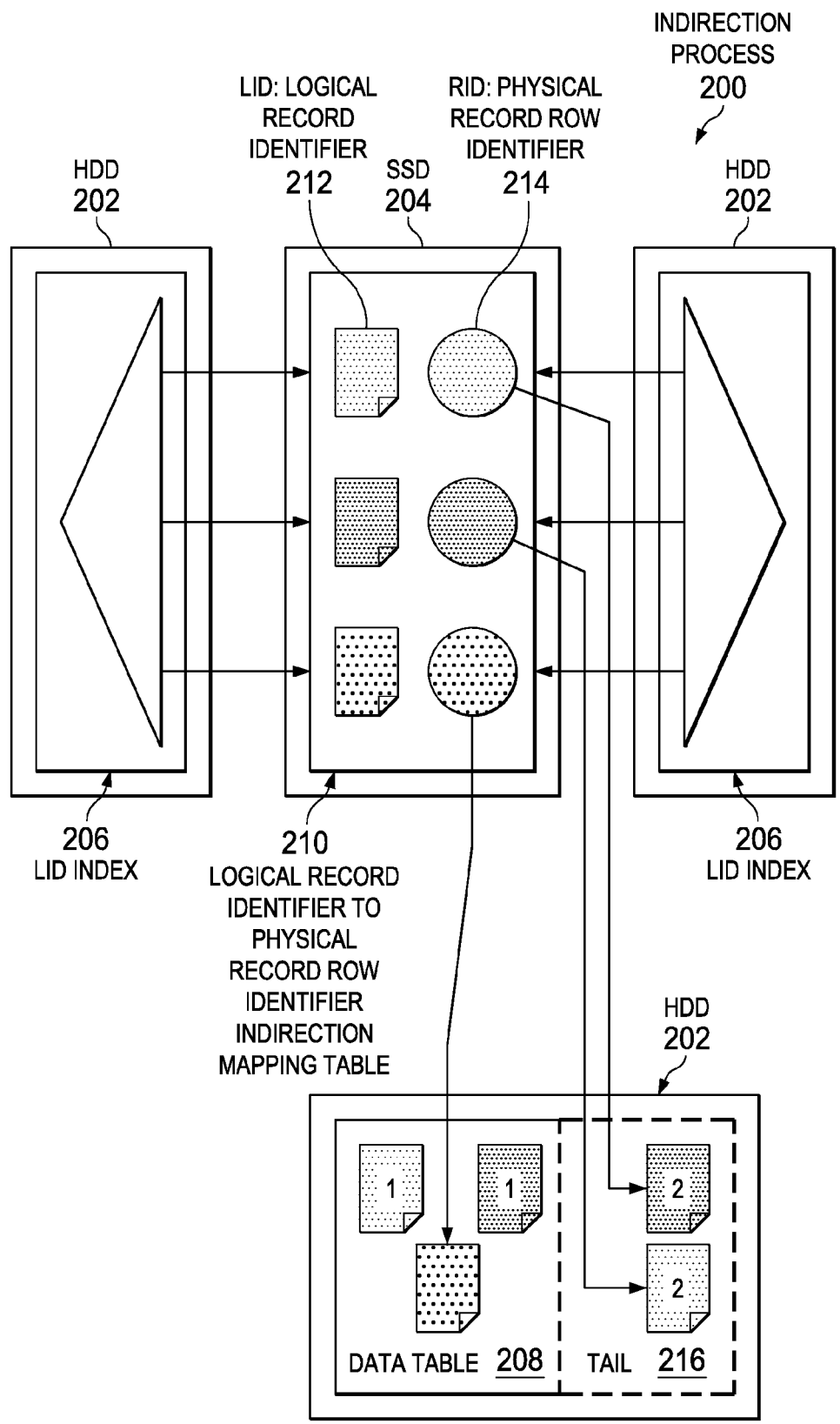
FIG. 2 is a diagram illustrating indirection using an indirection mapping table stored in a solid state storage device in accordance with an illustrative embodiment.
Figure 3:
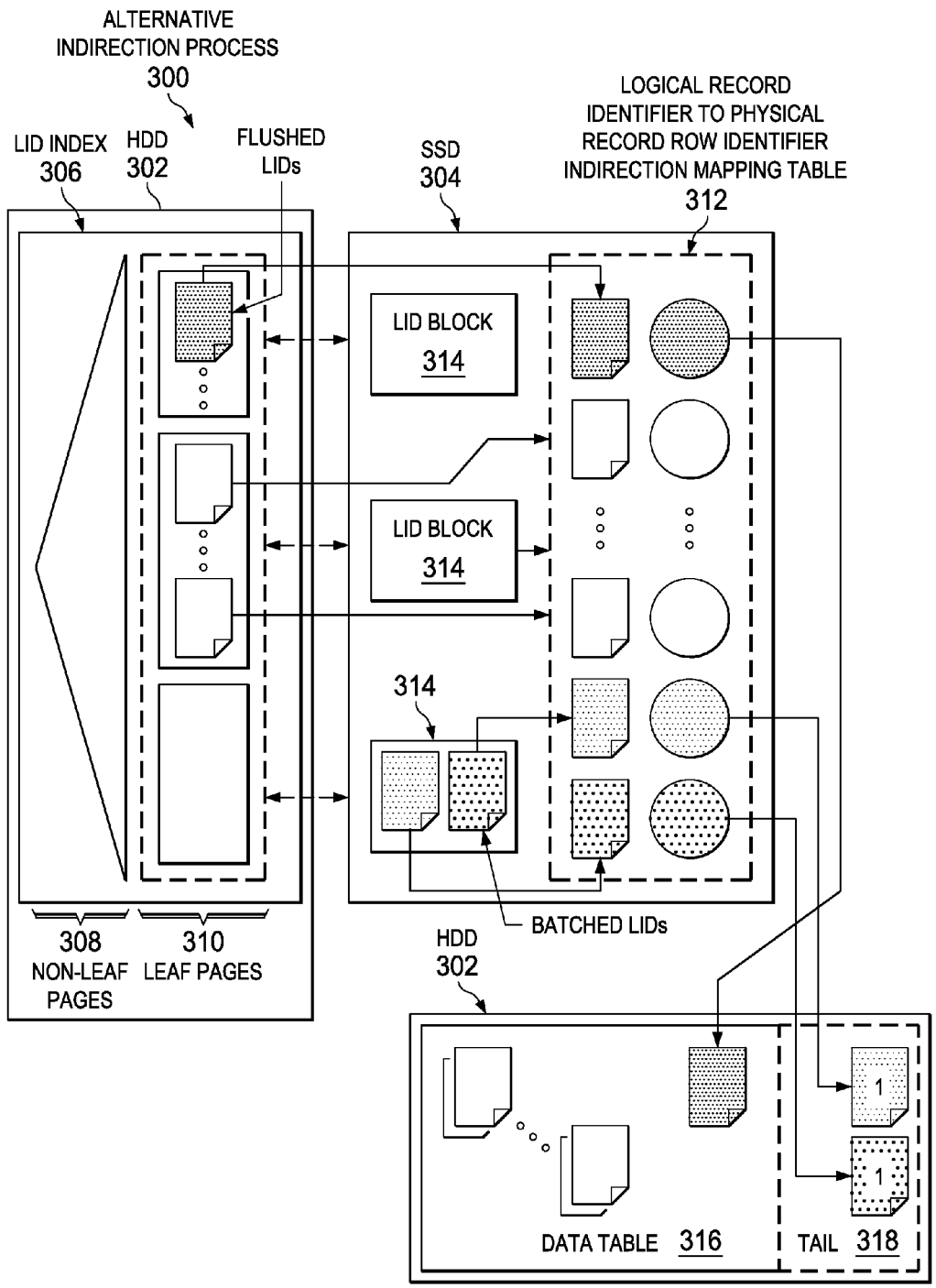
FIG. 3 is a diagram illustrating indirection using blocks of batched logical record identifiers stored in a solid state storage device in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a diagram of a data processing system is depicted in accordance with an illustrative embodiment. Data processing system 100 is an example of a computer device in which computer readable program code or instructions implementing processes of illustrative embodiments may be located. Data processing system 100 may be, for example, a server computer or a client computer connected to a network, such as a local area network (LAN), a wide area network (WAN), an intranet, an internet, or the Internet. In this illustrative example, data processing system 100 includes communications fabric 102, which provides communications between processor unit 104, memory 106, persistent storage 108, solid-state storage 110, communications unit 112, input/output (I/O) unit 114, and display 116.

Processor unit 104 serves to execute instructions for software applications or programs that may be loaded into memory 106. Processor unit 104 may be a set of one or more processors or may be a multi-processor core, depending on the particular implementation. Further, processor unit 104 may be implemented using one or more heterogeneous processor systems, in which a main processor is present with secondary processors on a single chip. As another illustrative example, processor unit 104 may be a symmetric multi-processor system containing multiple processors of the same type.

Memory 106 and persistent storage 108 are examples of computer readable storage devices 118. A computer readable storage device is any piece of hardware that is capable of storing information, such as, for example, without limitation, data, computer readable program code in functional form, and/or other suitable information either on a transient basis and/or a persistent basis. Further, a computer readable storage device does not include a propagation medium. Memory 106, in these examples, may be, for example, a random access memory, or any other suitable volatile or non-volatile storage device. Persistent storage 108 may take various forms, depending on the particular implementation. For example, persistent storage 108 may contain one or more devices. For example, persistent storage 108 may be a magnetic hard disc drive (HDD), a flash memory, a rewritable optical disk, a rewritable magnetic tape, or some combination of the above. The media used by persistent storage 108 may be removable. For example, a removable hard disc drive may be used for persistent storage 108.

In this example, persistent storage 108 stores data table 120 and logical record identifier (LID) indexes 122. However, it should be noted that persistent storage 108 may store any type of data, application, program, or module that may be utilized by different illustrative embodiments. Data table 120 may be, for example, a relational data table that stores a plurality of data records in rows and columns. The data records may represent any type of data. For example, the data records may be associated with a financial firm that is required to retain any changes made to client information for up to five years in accordance with auditing regulations or may be associated with a bank that needs to retroactively correct an error in calculating interest rates paid on different accounts.

Logical record identifier indexes 122 are data indexes corresponding to the plurality of data records stored in data table 120. It should be noted that illustrative embodiments include a logical record identifier index for each column of data records in data table 102. Logical record identifier indexes 122 may have, for example, tree structures that include a plurality of leaf pages or nodes. Logical record identifier indexes 122 store entries for version-independent logical record identifiers for each data record located in particular columns of data table 120. In other words, logical record identifier indexes 122 include a version-independent logical record identifier entry for each data record in a plurality of data records stored in a particular column of data table 120. A version-independent logical record identifier is a record identifier that identifies a particular data record in a particular column, but does not identify a particular version of the data record. In other words, the version-independent logical record identifier is not dependent upon a particular version within a plurality of different versions of the data record stored in data table 120.

Solid-state storage 110 is a solid-state drive (SSD) or data storage device using integrated circuit assemblies as memory to store data persistently. Solid-state storage 110 uses electronic interfaces compatible with persistent storage 108. Solid-state storage 110 has lower access time and less latency than persistent storage 108.

In this example, solid-state storage 110 stores indirection mapping table 124 and logical record identifier (LID) blocks 126. However, it should be noted that solid-state storage 110 may store any type of data that may be utilized by the different illustrative embodiments. Indirection mapping table 124 may be, for example, a hash table that maps a plurality of logical record identifiers to a plurality of physical record row identifiers. In other words, indirection mapping table 124 maps one version-independent logical record identifier to one version-dependent physical record row identifier, both of which correspond to a particular data record stored within data table 120. A version-dependent physical record row identifier is a record identifier that identifies a physical row location within data table 120 where a particular version, such as the most recent version, of a particular data record is stored. In other words, the version-dependent physical record identifier is dependent upon the most recent version within a plurality of different versions of a particular data record stored in data table 120.

In addition, indirection mapping table 124 may be, for example, keyed by logical record identifiers for faster lookups. Logical record identifier indexes 122 point to the logical record identifiers instead of the physical record row identifiers. One possible advantage to this approach is that when performing updating or deleting operations on data records, illustrative embodiments will not propagate the changes to all indexes, but will update indirection mapping table 124 instead.

Further, even though illustrative embodiments may need an extra level of indirection for each data search, the response time of illustrative embodiments is faster and smaller compared to the subsequent magnetic hard disk drive input/output because indirection mapping table 124 is stored on solid-state storage 110. Updates to one column in data table 120 will generate a new version of a row, which will change the version-independent logical recorder identifier to version-dependent physical record row identifier mapping for that particular row. However, it should be noted that illustrative embodiments will only make modification to the logical record identifier index for the changed column. Similarly, illustrative embodiments handle deletions by generating a null physical record row identifier for the corresponding logical record identifier, without any immediate need for updating leaf pages of the associated column index. Illustrative embodiments may still need to update all column indexes when appending data records to the end or "tail" of data table 120, but illustrative embodiments may batch these updates if there are more data record appends than index-dependent data queries. In an alternative illustrative embodiment, all or a portion of indirection mapping table 124 may be cached in memory 106. However, the alternative illustrative embodiment may log any updates on indirection mapping table 124 cached in memory 106 to ensure persistency.

Logical record identifier blocks 126 represent a plurality of blocks of batched logical record identifiers associated with data records stored in data table 120. Each block of batched logical record identifiers in logical record identifier blocks 126 may, for example, correspond to a different leaf page within a plurality of leaf pages of an index in logical record identifier indexes 122. Alternatively, a block of batched logical record identifiers may correspond to one entry in logical record identifier index 122.

Communications unit 112, in this example, provides for communication with other data processing systems and computing devices. Communications unit 113 may provide communications through the use of either or both physical and wireless communications links. The physical communications link may utilize, for example, a wire, cable, universal serial bus, or any other physical technology to establish a physical communications link for data processing system 100. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), or any other wireless communication technology or standard to establish a wireless communications link for data processing system 100.

Input/output unit 114 allows for the input and output of data with other devices that may be connected to data processing system 100. For example, input/output unit 114 may provide a connection for user input through a keypad, a keyboard, a mouse, and/or some other suitable input device. Display 116 provides a mechanism to display information to a user. In addition, display 116 may provide touch screen capabilities.

Instructions for the operating system, applications, and/or programs may be located in storage devices 118, which are in communication with processor unit 104 through communications fabric 102. In this illustrative example, the instructions are in a functional form on persistent storage 108. These instructions may be loaded into memory 106 for running by processor unit 104. The processes of the different embodiments may be performed by processor unit 104 using computer implemented instructions, which may be located in a memory, such as memory 106. These instructions are referred to as program code, computer usable program code, or computer readable program code that may be read and run by a processor in processor unit 104. The program code, in the different embodiments, may be embodied on different physical computer readable storage devices, such as memory 106 or persistent storage 108.

Program code 128 is located in a functional form on computer readable media 130 that is selectively removable and may be loaded onto or transferred to data processing system 100 for running by processor unit 104. Program code 128 and computer readable media 130 form computer program product 132. In one example, computer readable media 130 may be computer readable storage media 134 or computer readable signal media 136. Computer readable storage media 134 may include, for example, an optical or magnetic disc that is inserted or placed into a drive or other device that is part of persistent storage 108 for transfer onto a storage device, such as a magnetic hard disc drive, that is part of persistent storage 108. Computer readable storage media 134 also may take the form of a persistent storage device, such as a hard drive, a thumb drive, or a flash memory that is connected to data processing system 100. In some instances, computer readable storage media 134 may not be removable from data processing system 100.

Alternatively, program code 128 may be transferred to data processing system 100 using computer readable signal media 136. Computer readable signal media 136 may be, for example, a propagated data signal containing program code 128. For example, computer readable signal media 136 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 128 may be downloaded over a network to persistent storage 108 from another device or data processing system through computer readable signal media 136 for use within data processing system 100. For instance, program code stored in a computer readable storage media in a server data processing system may be downloaded over a network from the server to data processing system 100. The data processing system providing program code 128 may be a server computer, a client computer, or some other device capable of storing and transmitting program code 128.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of executing program code. As one example, data processing system 100 may include organic components integrated with inorganic components and/or may be comprised entirely of organic components excluding a human being. For example, a storage device may be comprised of an organic semiconductor.

As another example, a computer readable storage device in data processing system 100 is any hardware apparatus that may store data. Memory 106, persistent storage 108, solid-state storage 110, and computer readable storage media 134 are examples of physical computer readable storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

In the course of developing illustrative embodiments, it was discovered that data record insertions, deletions, and updates on a data table triggered input/output to keep the data record indexes current and up to date. With a traditional index structure, the deletion of a data record required the traversal of each index and the removal of the physical record row identifier (RID) from a leaf page of an index containing an entry for the data record. The update of a data record, such as changing one attribute value of the data record to a different value, generated a new version of the data record triggering a traversal of all indexes to change the physical record row identifier to the new version's physical record row identifier. In addition, in the case of a changed attribute value of a data record, the position of an entry corresponding to the data record in the index may also change. For a newly inserted data record, a new physical record row identifier associated with the data record must be inserted into each index. Further, these indexes may be large, and in aggregate, much too large to fit into a random access memory (RAM) bufferpool. As a result, all of the maintenance operations on these indexes will incur the overhead of physical input/output on the storage device.

These index maintenance operation overheads have historically been problematic for online transaction processing (OLTP) workloads that are update-intensive. As a result, online transaction processing workloads are often tuned to minimize the number of indexes available. This choice of minimizing the number of available indexes makes it more difficult to efficiently process data queries and to locate data records based on secondary attribute values. These capabilities are often important for operational data stores. For example, it is not uncommon to find tens of indexes to improve analytical and decision-making data queries even in enterprise resource planning (ERP) scenarios.

Illustrative embodiments reduce the overhead of index updates, so that indexes are used effectively for analytical data query processing without being a heavy burden on transaction throughput. Typically, the execution time for analytical data queries is reduced as more indexes are added. However, illustrative embodiments by employing an indirection mapping table significantly reduce the incurred index update overhead.

Illustrative embodiments utilize a solid-state storage device to store the indirection mapping table. Solid-state storage devices are orders of magnitude faster than magnetic hard disk drive storage devices for small, random input/outputs. However, per gigabyte, solid-state storage devices are more expensive than magnetic hard disk drive storage devices. Consequently, illustrative embodiments store the bulk of the data on the magnetic hard disk drive and reserve the solid-state drive for portions of the data that are accessed frequently and randomly.

In contrast to previous approaches, illustrative embodiments do not simply store "hot" data on the solid-state drive, but instead change the data structures in the storage hierarchy to store the indirection mapping table on the solid-state drive. Because the solid-state drive is relatively faster, the overhead incurred during index traversal is small. As a result, storing the indirection mapping table on the solid-state drive dramatically reduces the overhead associated with magnetic hard disk drive input/output needed for index updates. Illustrative embodiments only need solid-state drive input/output for data record deletion and update operations, with the exception of indexes on changed data record attribute values. Illustrative embodiments also reduce the magnetic hard disk drive input/output overhead for data record insertions. Furthermore, it should be noted that even though this specification describes illustrative embodiments using solid-state drives, illustrative embodiments are not restricted to only using solid-state drives. For example, alternative illustrative embodiments may utilize other types of high-speed storage devices, such as an auto-commit memory, with smaller input/output granularities providing increased performance. An auto-commit memory refers to volatile memory that is preconfigured to perform one or more commit actions automatically when triggered by the occurrence of one or more predetermined conditions.

Further, illustrative embodiments may support multi-version concurrency control (MVCC). Multi-version concurrency control is reviving mostly due to the increased concurrency available in modern hardware, such as large main memories and multi-core processors. However, this increased concurrency comes at the cost of increased locking contention among concurrent read/update data queries, which may be alleviated using optimistic locking over a multi-version database.

Illustrative embodiments organize the data records in a single data table, which contains both current data records and historical data records. Illustrative embodiments append new rows to an end or tail of the data table. Data record updates need to read the data table once and write a new version of the data record to the end of the table. Illustrative embodiments focus on applications that primarily use current data records, but occasionally need to access older versions of the data records. To support data queries over current data records, the most recent version of a data record appears in an index entry.

Thus, illustrative embodiments provide a data processing system and computer program product for managing different versions of a data record. A data processing system maintains a mapping between a version-independent logical record identifier and a version-dependent physical record row identifier that correspond to each data record within a plurality of data records of a data table using a logical record identifier to physical record row identifier indirection mapping table. The data processing system updates entries within leaf pages of an index associated with the data table to point to the version-independent logical record identifier corresponding to a data record instead of pointing to the version-dependent physical record row identifier corresponding to the data record. The data processing system also updates the logical record identifier to physical record row identifier indirection mapping table in response to performing an operation on the data record instead of updating the entries within the leaf pages of the index associated with the data table.

With reference now to FIG. 2, a diagram illustrating indirection using an indirection mapping table stored in a solid state storage device is depicted in accordance with an illustrative embodiment. Indirection process 200 may be implemented in a data processing system, such as data processing system 100 in FIG. 1, for example. Indirection process 200 utilizes hard disk drive 202 and solid-state drive 204. Hard disk drive 202 may be, for example, a magnetic hard disk storage device, such as persistent storage 108 in FIG. 1. Solid-state drive 204 may be, for example, solid-state storage 110 in FIG. 1.

Hard disk drive 202 includes logical record identifier index 206, such as logical record identifier indexes 122 in FIG. 1. Logical record identifier index 206 includes entries corresponding to a plurality of data records within data table 208, such as data table 120 in FIG. 1, which are stored in hard disk drive 202. Solid-state drive 204 includes logical record identifier to physical record row identifier indirection mapping table 210, such as indirection mapping table 124 in FIG. 1. Logical record identifier to physical record row identifier indirection mapping table 210 includes logical record identifier 212 and physical record row identifier 214 for each data record entry in logical record identifier index 206.

Traditional index structures directly reference a data record in data table 208 via physical record row identifier 214 only. Physical record row identifier 214 typically encodes a combination of a database partition identifier, a page number within the partition, and a row number within the page where the data record is stored. However, only using physical record row identifier 214 to reference a data record hinders the update performance of a multi-version database in which updates result in a new physical location for an updated data record. Changes to the data record induce input/output for every index, even indexes on "unaffected" attribute values that have not changed. Random input/outputs are required to modify hard disk drive-resident leaf pages.

To avoid hard disk drive input/output for indexes on unaffected attribute values, indirection process 200 decouples the physical and logical representations of data records spanning a plurality of versions. Indirection process 200 distinguishes between physical record row identifier 214 and logical record identifier 212, which correspond to a particular data record. For any given data record, a plurality of physical record row identifiers may exist for a particular data record. Each of the plurality of physical row identifiers for a particular data record corresponds to a physical location of a different version of that particular data record within the data table.

In contrast, indirection process 200 utilizes logical record identifier 212, which corresponds to one physical record row identifier 214 representing the most recent version of the data record. In addition, indirection process 200 utilizes logical record identifier 212 as a primary key in logical record identifier to physical record row identifier indirection mapping table 210. As a result, indirection process 200 may now reference version-independent logical record identifiers within indexes stored in hard disk drive 202 rather than referencing version-dependent physical record row identifiers in leaf pages of the indexes.

Indirection process 200 utilizes logical record identifier to physical record row identifier indirection mapping table 210 stored in solid-state drive 204 to convert logical record identifier 212 to physical record row identifier 214 during a traversal of logical record identifier index 206 stored in hard disk drive 202. Indirection process 200 treats a missing logical record identifier or a logical record identifier with a corresponding null physical record row identifier in logical record identifier to physical record row identifier indirection mapping table 210 as a deleted row and ignores these entries during a search for data records. By placing logical record identifier to physical record row identifier indirection mapping table 210 on solid-state drive 204, indirection process 200 ensures that the input/output overhead for the extra indirection is relatively small. Because solid-state drive 204 is a persistent storage device, logical record identifier to physical record row identifier indirection mapping table 210 can be recovered after a computer crash. Further, because indirection process 200 only needs a few solid-state drive bytes per data record, it is possible to handle a large magnetic disk drive footprint with a much smaller solid-state drive footprint.

When an existing data record is modified, a new version of that data record is generated. Consequently, indirection process 200 updates logical record identifier to physical record row identifier indirection mapping table 210 to associate the physical record row identifier for the new row in data table 208 containing the new version of the data record to the existing logical record identifier corresponding to that data record. As a result, indexes on unchanged attribute values remain valid. Thus, indirection process 200 only requires index input/output for the changed attribute value.

When a data record is deleted, indirection process 200 deletes the logical record identifier/physical record row identifier pair for that particular data record from logical record identifier to physical record row identifier indirection mapping table 210. Index traversals ignore missing logical record identifiers. Indexes may update their leaf pages during traversal, when a read input/output is performed. At that time, when missing logical record identifiers are encountered, indirection process 200 removes those logical record identifiers from the index leaf pages. After a long period of activity, indexes should be validated offline against logical record identifier to physical record row identifier indirection mapping table 210 to remove deleted logical record identifiers that subsequently have not been searched for.

When a new data record is added, indirection process 200 appends or adds the new data record to tail 216 of data table 208. Then, indirection process 200 determines the physical record row identifier associated with the location of the new data record within tail 216 and associates the determined physical record row identifier with a newly generated logical record identifier that corresponds to the new data record. Indirection process 200 also adds the logical record identifier/physical record row identifier pair for the new data record to logical record identifier to physical record row identifier indirection mapping table 210. In addition, indirection process 200 updates logical record identifier index 206 with the new logical record identifier corresponding to the new data record.

With reference now to FIG. 3, a diagram illustrating indirection using blocks of batched logical record identifiers stored in a solid state storage device is depicted in accordance with an illustrative embodiment. Alternative indirection process 300 may be implemented in a data processing system, such as data processing system 100 in FIG. 1, for example. Alternative indirection process 300 utilizes hard disk drive 302 and solid-state drive 304. Hard disk drive 302 may be, for example, a magnetic hard disk storage device, such as persistent storage 108 in FIG. 1. Solid-state drive 304 may be, for example, solid-state storage 110 in FIG. 1.

Hard disk drive 302 includes logical record identifier index 306, such as logical record identifier index 206 in FIG. 2. Logical record identifier index 306 includes entries corresponding to a plurality of data records within data table 316, such as data table 120 in FIG. 1, which are stored in hard disk drive 302. Alternative indirection process 300 organizes the entries for the plurality of data records into non-leaf pages 308 and leaf pages 310.

Solid-state drive 304 includes logical record identifier to physical record row identifier indirection mapping table 312, such as indirection mapping table 124 in FIG. 1. Solid-state drive 304 also includes logical record identifier blocks 314. Each logical record identifier block 314 is associated with a particular leaf page within leaf pages 310 of logical record identifier index 306. Alternatively, a logical record identifier block may be associated with a single data record entry in logical record identifier index 306 within non-leaf pages 308.

To reduce the index overhead for insertions, alternative indirection process 300 utilizes an auxiliary logical record identifier block 314, which contains a fixed number of logical record identifiers. Each logical record identifier block 314 is a block of batched logical record identifiers corresponding to a particular data record. The logical record identifiers in a logical record identifier block 314 may be a null entry or may be a valid logical record identifier from logical record identifier to physical record row identifier indirection mapping table 312. Alternative indirection process 300 maps references to a logical record identifier block 314 to multiple logical record identifiers through this extra level of indirection.

Consider the case of a dense index. A dense index is a secondary index that contains more entries than what a single leaf page can contain for an attribute value. For such a dense index, alternative indirection process 300 keeps a list of logical record identifiers for each attribute value as before. In addition, alternative indirection process 300 stores a set of logical record identifier blocks 314 on solid-state drive 304 in a hash table, which is hashed by the attribute value. Initially, alternative indirection process 300 associates each indexed attribute value with a logical record identifier block 314 whose logical record identifiers are all null entries.

When a new data record is inserted, alternative indirection process 300 modifies each logical record identifier index 306 to reflect the insertion. For example, suppose that a value of an indexed attribute is "v" and that the index is dense. Alternative indirection process 300 generates a logical record identifier for the new data record and adds a logical record identifier/physical record row identifier pair to logical record identifier to physical record row identifier indirection mapping table 312. Alternative indirection process 300 identifies the logical record identifier block "B" that corresponds to the attribute value v by accessing the hash table of logical record identifier blocks on solid-state drive 304. If there are null or unused entries within logical record identifier block B, then alternative indirection process 300 overwrites one of the null entries with the logical record identifier of the new data record. If there are no null entries within logical record identifier block B, then alternative indirection process 300 moves all the logical record identifiers within block B and the logical record identifier of the new data record in bulk into logical record identifier index 306, amortizing the input/output overhead cost.

In this model, index traversal is slightly more complex. For example, all the non-null entries within the logical record identifier block corresponding to a particular attribute value also need to be treated as matches. Deletions and updates of an attribute value also may need to traverse and modify a corresponding logical record identifier block. Also, there is some additional input/output overhead, but only on solid-state drive 304.

When few matches per index attribute value exist, the organization above would need a very large number of logical record identifier blocks 314, most of which would be underutilized. Instead, for sparse indexes alternative indirection process 300 maintains a single logical record identifier block 314 for an entire leaf page of logical record identifier index 306. Rather than using a hash table hashed by attribute values, alternative indirection process 300 uses a hash table hashed by the address of the index leaf page. Alternative indirection process 300 may obtain this address using a partial traversal of logical record identifier block 314, without accessing the leaf page itself. Since the internal non-leaf pages 308 of a tree index occupy much less space than the leaf pages 310, the internal non-leaf pages 308 are much more likely to be resident in the main memory bufferpool.

Data record searches have some additional overhead, because alternative indirection process 300 may need to consult the shared logical record identifier block even for data records that may not match the search condition. There also would be overhead during page splits and merges to maintain the logical record identifier block structure.

The overhead of logical record identifier blocks 314 on data record searches may be high for sparse indexes. For example, previously a unique index search would have to look up one main file record only. Using a block of batched logical record identifiers for a given key range, a data record search may need to read all of the logical record identifiers contained within the block. However, this example suggests an optimization of storing both the logical record identifier and the key in the logical record identifier block for sparse indexes. This optimization reduces the capacity of logical record identifier blocks 314, but significantly improves the input/output of hard disk drive 302 for narrow searches.

Using logical record identifier blocks 314, it is now possible that an update or delete operation may occur on a data record whose logical record identifier is contained within a particular logical record identifier block rather than within logical record identifier to physical record row identifier indirection mapping table 312. For deletions, alternative indirection process 300 may simply set the logical record identifier to a null entry within the particular logical record identifier block. For updates that change the position of an entry for a data record within logical record identifier index 306, alternative indirection process 300 may nullify the logical record identifier in the previous logical record identifier block or logical record identifier to physical record row identifier indirection mapping table 312 and insert the logical record identifier into a new logical record identifier block corresponding to the data record.

In this way, logical record identifier blocks 314 also improve the input/output behavior of updates to indexes on changed attribute values. Previously, hard disk drive-resident index leaf pages appropriate to the new attribute value needed to be updated with the logical record identifier of the updated data record. Now, alternative indirection process 300 only needs to write on logical record identifier blocks 314 located in solid-state drive 304 most of the time. Hard disk drive 302 writes are amortized over the number of data records per logical record identifier block 314.

An illustrative example is now presented. Consider a data table "R" (A;B;C;D) with tree indexes on all four attribute values. Attribute value A is the primary key, and is, therefore, sparse. Attribute value B also is sparse, while attribute values C and D are dense. Data table R is stored on hard disk drive 302 in a versioned fashion. For each row, illustrative embodiments show the physical record row identifier of the previous version, if any, of the row. Also, the previous-physical record row identifier may or may not be explicitly stored. Suppose that at a given point in time, an extension of data table R includes the rows listed below. A flag indicating whether the row has been deleted also is included.

| RID | A | B | C | D | Prev-RID | Deleted |
|-----|-----|------|---|---|----------|---------|
| 345 | 100 | 3732 | 3 | 5 | 123 | 0 |
| 367 | 120 | 4728 | 3 | 6 | NULL | 0 |
| 369 | 130 | 2351 | 2 | 5 | NULL | 0 |
| 501 | 100 | 3732 | 2 | 5 | 345 | 0 |

Also, suppose that the logical record identifier to physical record row identifier indirection mapping table associated with data table R is as follows:

| LID | RID |
|-----|-----|
| 10 | 367 |
| 11 | 369 |
| 13 | 501 |

Indexes use the logical record identifiers 10, 11, and 13 rather than the physical record row identifiers 367, 369, and 501 to refer to rows in the data table R. Also, only the most recent version of the rows for data records is indexed. Given the multi-version database above, the immediate and deferred changes to the database in response to various update operations are described below.

It should be noted that input/output estimates assume that all internal index non-leaf pages are resident in a random access memory bufferpool and that all leaf pages require input/output. Also, these estimates assume that all accesses to structures resident in the solid-state drive require input/output. In addition, the estimates assume direct access to a page given the logical record identifier, which may be supported by a hash table. Further, assume that logical record identifier blocks contain a pre-determined number of logical record identifiers and that for sparse indexes both the key and the logical record identifier are stored in the logical record identifier block. Immediate actions must be completed within the operation itself. Deferred actions are those that may occur at a later time, such as when an operation causes a page to become dirty in the bufferpool, but the actual input/output write comes later.

Using the example above, the row with primary key 100 is updated such that attribute value D is changed from 5 to 6. The immediate actions are: 1) the logical record identifier of the row, i.e., 13, is identified using the index on attribute value A, which requires one hard disk drive read; 2) the entry 13; 501 in the indirection mapping table is read, which requires one solid-state drive read; 3) the row with physical record row identifier 501 is read, which requires one hard disk drive read; 4) a new version of the data record is generated at the tail of data table R, such as at tail 318 of data table 316, with a new value for attribute value D and a new physical record row identifier for the new version, suppose 601; 5) an index traversal for key 5 is initiated on attribute value D. If logical record identifier 13 is present in the corresponding leaf page, then the logical record identifier is deleted from the leaf page. Otherwise, logical record identifier 13 is present in the logical record identifier block corresponding to key 5 and is deleted from that logical record identifier block. This action requires one hard disk drive read and possibly one solid-state drive read; and 6) a partial index traversal for key 6 is initiated on attribute value D and logical record identifier 13 is inserted into the corresponding logical record identifier block, which requires one solid-state read.

The deferred action are: 1) the data page containing the row with physical record row identifier 601 is dirty and needs to be flushed to the hard disk drive, which requires one hard disk drive write amortized over all modifications to the data page; 2) the entry 13; 501 in the indirection mapping table is changed to 13; 601, which requires one solid-state drive write; 3) the index page containing the key 5 will be dirty if logical record identifier 13 was present in the leaf page. The dirty page needs to be flushed to the hard disk drive, which requires one hard disk drive write, amortized over all modifications to the page. If logical record identifier 13 was present in the logical record identifier block corresponding to key 5, then the dirty logical record identifier block needs to be flushed to the solid-state drive, which requires one solid-state drive write; and 4) the logical record identifier block corresponding to key 6 is dirty and needs to be flushed to the solid-state drive, which requires one solid-state drive write.

Now consider the insertion of a new data record 140; 9278; 2; 6 into the data table R. The resulting immediate actions are: 1) the absence of a previous version of the row is verified using the index on attribute value A, including the corresponding logical record identifier block, which requires one hard disk drive read and one solid-state drive read; 2) a new row is generated at the tail of the data table R, with a new physical record row identifier corresponding to the new data record, suppose 654. The previous-physical record row identifier field is null; 3) a new logical record identifier corresponding to the new data record is generated, suppose 15; 4) for the two dense indexes on attribute values C and D, the logical record identifier blocks corresponding to keys 2 and 6, respectively, are identified and logical record identifier 15 is inserted into each logical record identifier block, which requires two solid-state drive reads; and 5) for the two sparse indexes on attribute values A and B, the logical record identifier blocks corresponding to keys 140 and 9278, respectively, are identified using partial index traversals and logical record identifier 15 is inserted and paired with the appropriate key into each logical record identifier block, which requires two solid-state drive reads.

The associated deferred actions are: 1) the data page containing the row with physical record row identifier 654 is dirty and needs to be flushed to the hard disk drive, which require one hard disk drive write, amortized over all modifications to the page; 2) the entry 15; 654 is inserted into the indirect mapping table, which requires one solid-state drive read and one solid-state drive write; 3) the logical record identifier blocks corresponding to each of the four indexes are dirty and need to be flushed to the solid-state drive, which requires four solid-state drive writes; and 4) in the event that a logical record identifier block fills one time in a predetermined number of insertions, all logical record identifiers in the logical record identifier block are converted into regular index logical record identifiers and the logical record identifier block is reset to an empty state, which requires four solid-state drive writes, three hard disk drive reads (i.e., the leaf page in the index on attribute value A has already been read), and four hard disk drive writes.

Now consider the deletion of the row with primary key 100, which results in the following immediate actions: 1) the logical record identifier of the deleted row (i.e., 13) is identified using the index on attribute value A, which requires one hard disk drive read and possibly one solid-state drive read; 2) the pair 13; 501 in the indirection mapping table is located, which require one solid-state drive read; 3) the row with physical record row identifier 501 is read and the deleted flag is set to 1, which requires one hard disk drive read; and 4) logical record identifier 13 is deleted from the leaf page of the index on attribute value A.

The associated deferred actions for deleting row with primary key 100 are: 1) the data page containing the row with physical record row identifier 501 is dirty and needs to be flushed to the hard disk drive, which require one hard disk drive write, amortized over all modifications to the page; 2) the pair 13; 501 in the indirection mapping table is deleted, which require one solid-state drive write; 3) the index leaf page for attribute value A containing the primary key 100 is dirty and needs to be flushed to the hard disk drive, which requires one hard disk drive write, amortized over all modifications to the page; 4) whenever one of the other indexes is traversed and logical record identifier 13 is reached, then logical record identifier 13 is deleted from the corresponding logical record identifier list, which require one extra hard disk drive write to modify the leaf page, amortized over all modifications to the page.

Now consider that a data record search returns a number of matches that all fit into one index leaf page of a sparse index. Since no write is involved, the search consists of only immediate actions. The immediate actions are: 1) traverse the index, which require one hard disk drive read; 2) read the logical record identifier block corresponding to the leaf page, which requires one solid-state drive read; 3) map the logical record identifiers to the physical record row identifiers using the indirection mapping table, which require the number of solid-state drive reads; and 4) read all matching records, which requires the number of hard disk drive reads assuming an un-clustered table.

Figure 4:
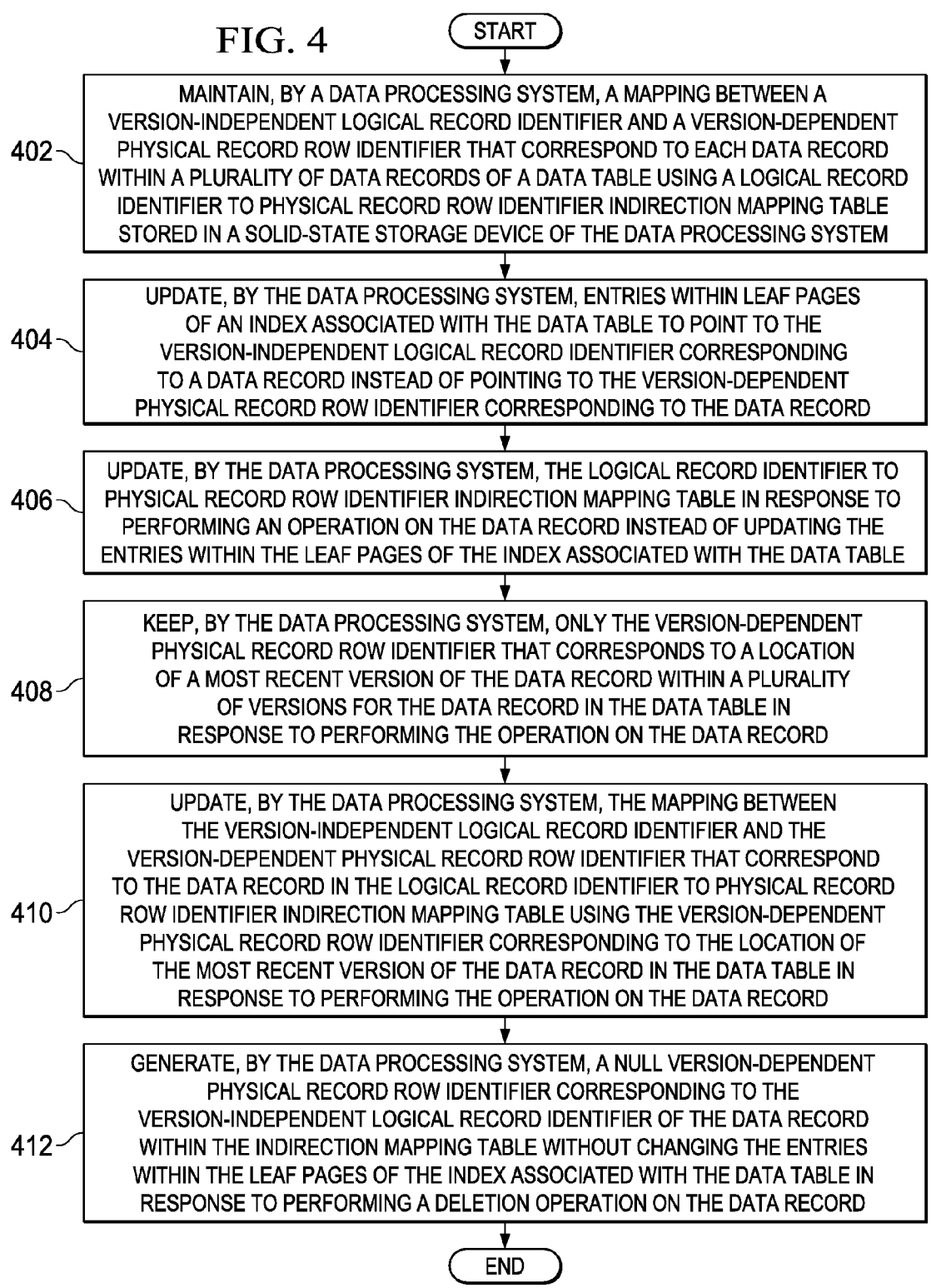
FIG. 4 is a flowchart illustrating a process for managing a multi-version database in accordance with an illustrative embodiment.

With reference now to FIG. 4, a flowchart illustrating a process for managing a multi-version database is shown in accordance with an illustrative embodiment. The process shown in FIG. 4 may be implemented in a data processing system, such as, for example, data processing system 100 in FIG. 1.

The process begins when the data processing system maintains a mapping between a version-independent logical record identifier and a version-dependent physical record row identifier that correspond to each data record within a plurality of data records of a data table using a logical record identifier to physical record row identifier indirection mapping table stored in a solid-state storage device of the data processing system (step 402). In addition, the data processing system updates entries within leaf pages of an index associated with the data table to point to the version-independent logical record identifier corresponding to a data record instead of pointing to the version-dependent physical record row identifier corresponding to the data record (step 404). Further, the data processing system updates the logical record identifier to physical record row identifier indirection mapping table in response to performing an operation on the data record instead of updating the entries within the leaf pages of the index associated with the data table (step 406).

The data processing system also keeps only the version-dependent physical record row identifier that corresponds to a location of a most recent version of the data record within a plurality of versions for the data record in the data table in response to performing the operation on the data record (step 408). Furthermore, the data processing system updates the mapping between the version-independent logical record identifier and the version-dependent physical record row identifier that correspond to the data record in the logical record identifier to physical record row identifier indirection mapping table using the version-dependent physical record row identifier corresponding to the location of the most recent version of the data record in the data table in response to performing the operation on the data record (step 410). Moreover, the data processing system generates a null version-dependent physical record row identifier corresponding to the version-independent logical record identifier of the data record within the indirection mapping table without changing the entries within the leaf pages of the index associated with the data table in response to performing a deletion operation on the data record (step 412). Thereafter, the process terminates.

Figure 5:
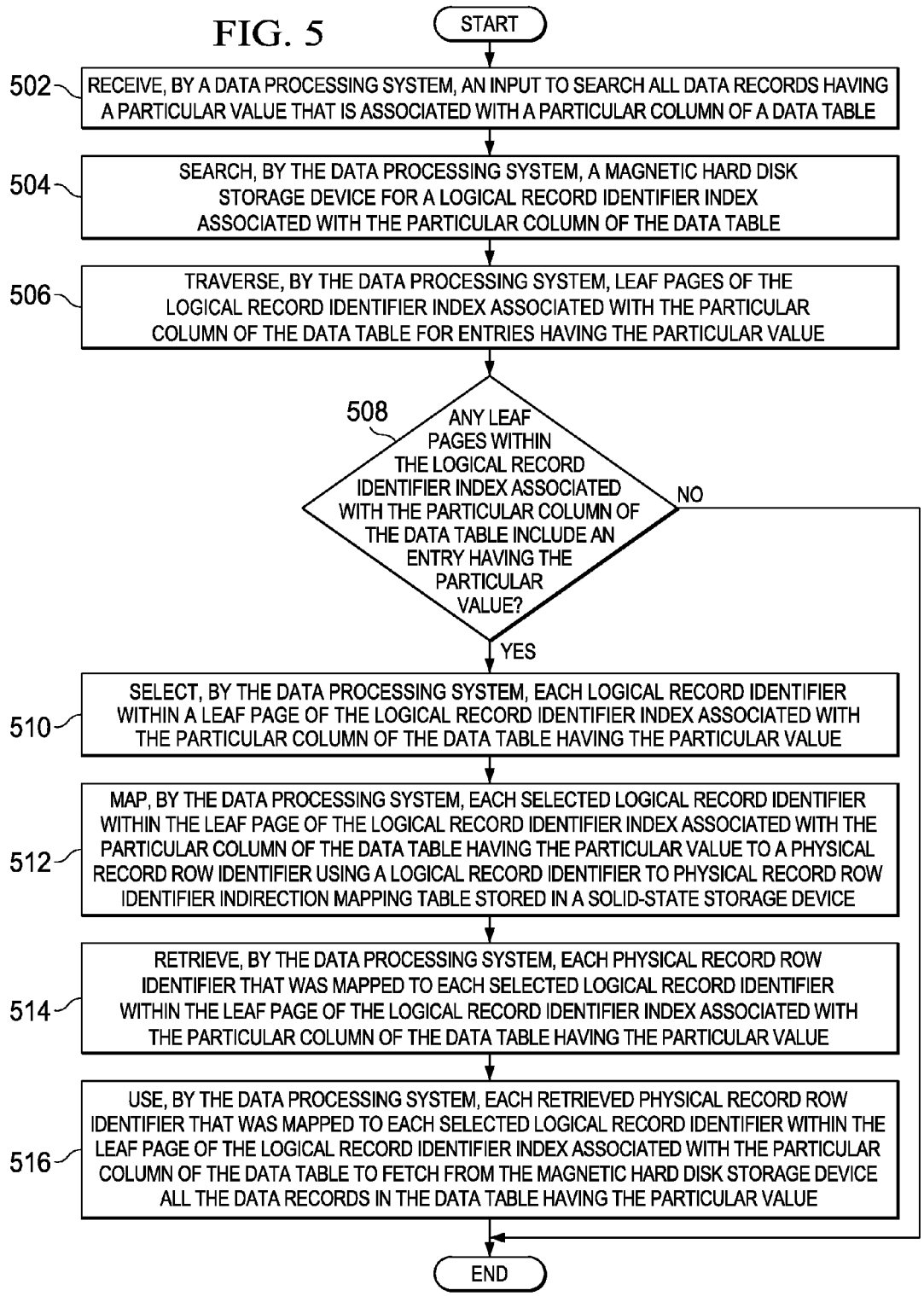
FIG. 5 is a flowchart illustrating a process for searching data records in a relational data table using an indirection mapping table in accordance with an illustrative embodiment.

With reference now to FIG. 5, a flowchart illustrating a process for searching data records in a relational data table using an indirection mapping table is shown in accordance with an illustrative embodiment. The process shown in FIG. 5 may be implemented in a data processing system, such as, for example, data processing system 100 in FIG. 1.

The process begins when the data processing system receives an input to search all data records having a particular value that is associated with a particular column of a data table (step 502). Afterward, the data processing system searches a magnetic hard disk storage device for a logical record identifier index associated with the particular column of the data table (step 504). In addition, the data processing system traverses leaf pages of the logical record identifier index associated with the particular column of the data table for entries having the particular value (step 506).

Subsequently, the data processing system makes a determination as to whether any leaf pages within the logical record identifier index associated with the particular column of the data table include an entry having the particular value (step 508). If the data processing system determines that leaf pages within the logical record identifier index associated with the particular column of the data table do not include an entry having the particular value, no output of step 508, then the process terminates thereafter. If the data processing system determines that leaf pages within the logical record identifier index associated with the particular column of the data table do include an entry having the particular value, yes output of step 508, then the data processing system selects each logical record identifier within a leaf page of the logical record identifier index associated with the particular column of the data table having the particular value (step 510).

Afterward, the data processing system maps each selected logical record identifier within the leaf page of the logical record identifier index associated with the particular column of the data table having the particular value to a physical record row identifier using a logical record identifier to physical record row identifier indirection mapping table stored in a solid-state storage device (step 512). Further, the data processing system retrieves each physical record row identifier that was mapped to each selected logical record identifier within the leaf page of the logical record identifier index associated with the particular column of the data table having the particular value (step 514). Furthermore, the data processing system uses each retrieved physical record row identifier that was mapped to each selected logical record identifier within the leaf page of the logical record identifier index associated with the particular column of the data table to fetch from the magnetic hard disk storage device all the data records in the data table having the particular value (step 516).

Figure 6:
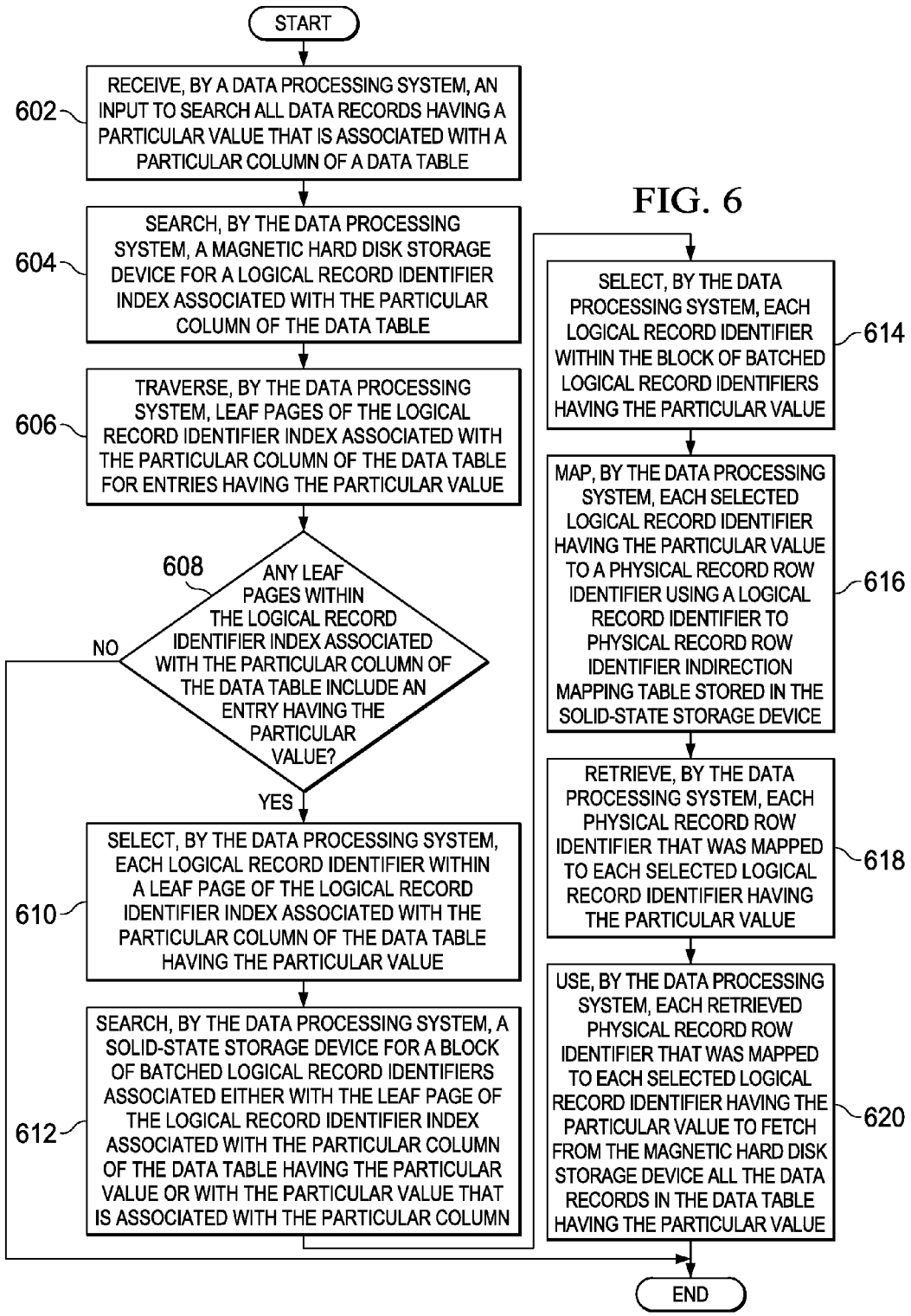
FIG. 6 is a flowchart illustrating a process for searching data records in a relational data table using an indirection mapping table and blocks of batched logical record identifiers in accordance with an illustrative embodiment.

With reference now to FIG. 6, a flowchart illustrating a process for searching data records in a relational data table using an indirection mapping table and blocks of batched logical record identifiers is shown in accordance with an illustrative embodiment. The process shown in FIG. 6 may be implemented in a data processing system, such as, for example, data processing system 100 in FIG. 1.

The process begins when the data processing system receives an input to search all data records having a particular value that is associated with a particular column of a data table (step 602). Afterward, the data processing system searches a magnetic hard disk storage device for a logical record identifier index associated with the particular column of the data table (step 604). In addition, the data processing system traverses leaf pages of the logical record identifier index associated with the particular column of the data table for entries having the particular value (step 606).

Subsequently, the data processing system makes a determination as to whether any leaf pages within the logical record identifier index associated with the particular column of the data table include an entry having the particular value (step 608). If the data processing system determines that leaf pages within the logical record identifier index associated with the particular column of the data table do not include an entry having the particular value, no output of step 608, then the process terminates thereafter. If the data processing system determines that leaf pages within the logical record identifier index associated with the particular column of the data table do include an entry having the particular value, yes output of step 608, then the data processing system selects each logical record identifier within a leaf page of the logical record identifier index associated with the particular column of the data table having the particular value (step 610).

Afterward, the data processing system selects each logical record identifier within a leaf page of the logical record identifier index associated with the particular column of the data table having the particular value (step 610). In addition, the data processing system searches a solid-state storage device for a block of batched logical record identifiers associated either with the leaf page of the logical record identifier index associated with the particular column of the data table having the particular value or with the particular value that is associated with the particular column (step 612). Then, the data processing system selects each logical record identifier within the block of batched logical record identifiers having the particular value (step 614).

Subsequently, the data processing system maps each selected logical record identifier having the particular value to a physical record row identifier using a logical record identifier to physical record row identifier indirection mapping table stored in the solid-state storage device (step 616). Afterward, the data processing system retrieves each physical record row identifier that was mapped to each selected logical record identifier having the particular value (step 618). Then, the data processing system uses each retrieved physical record row identifier that was mapped to each selected logical record identifier having the particular value to fetch from the magnetic hard disk storage device all the data records in the data table having the particular value (step 620). Thereafter, the process terminates.

Figure 7B:
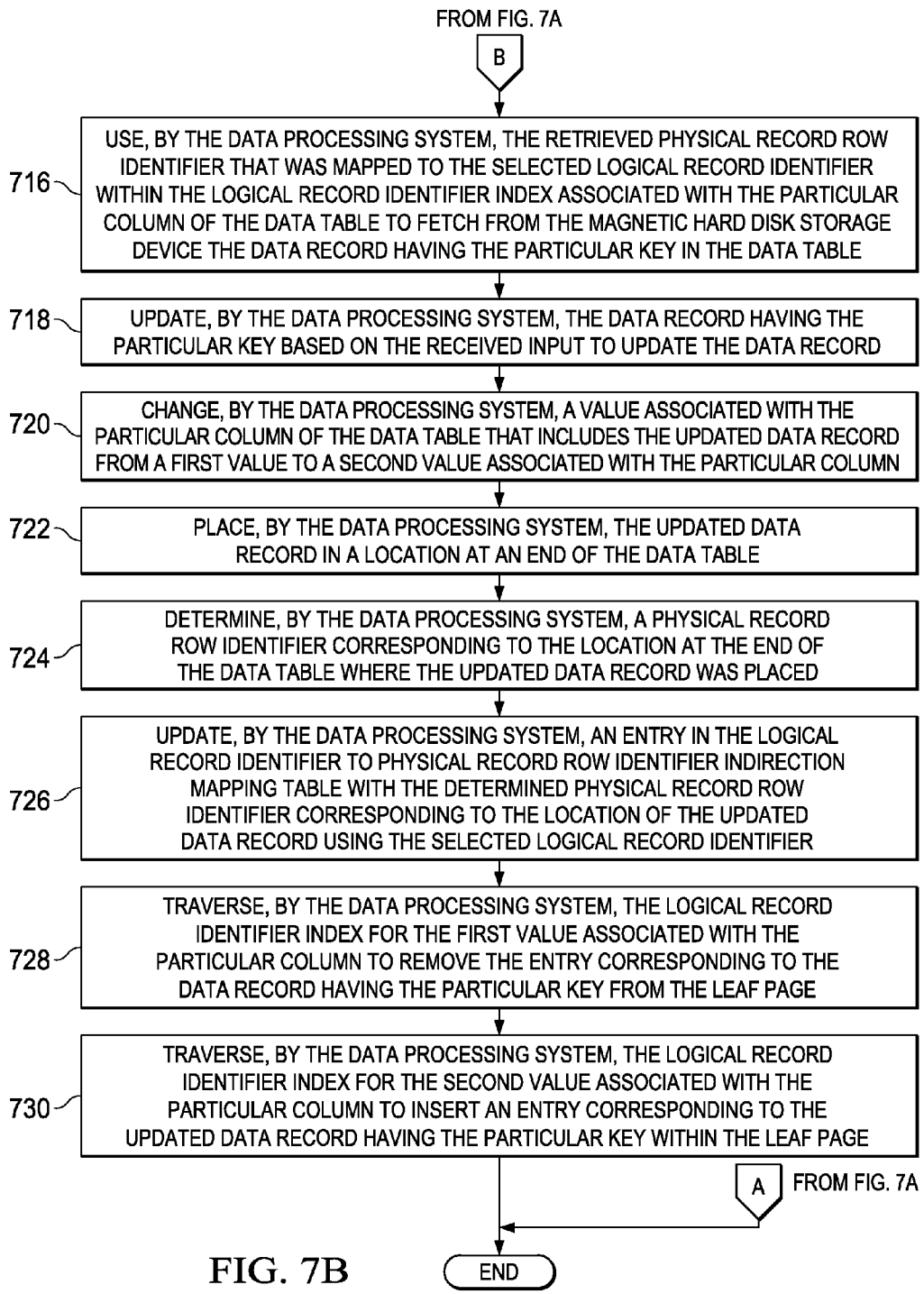

With reference now to FIGS. 7A and 7B, a flowchart illustrating a process for updating data records in a relational data table using an indirection mapping table is shown in accordance with an illustrative embodiment. The process shown in FIGS. 7A-7B are may be implemented in a data processing system, such as, for example, data processing system 100 in FIG. 1.

The process begins when the data processing system receives an input to update a data record having a particular key within a data table (step 702). Afterward, the data processing system searches a magnetic hard disk storage device for a primary key index associated with the data table (step 704). Then, the data processing system traverses the primary key index associated with the data table for an entry corresponding to the data record having the particular key (step 706). Subsequently, the data processing system makes a determination as to whether a leaf page within the primary key index associated with the data table includes an entry corresponding to the data record having the particular key (step 708).

If the data processing system determines that no leaf pages within the primary key index associated with the data table include an entry corresponding to the data record having the particular key, no output of step 708, then the process terminates thereafter. If the data processing system determines that a leaf page within the primary key index associated with the data table does include an entry corresponding to the data record having the particular key, yes output of step 708, then the data processing system selects a logical record identifier within a logical record identifier index associated with a particular column of the data table that includes the data record having the particular key (step 710). In addition, the data processing system maps the selected logical record identifier within the logical record identifier index associated with the particular column of the data table that includes the data record having the particular key to a physical record row identifier using a logical record identifier to physical record row identifier indirection mapping table stored in a solid-state storage device (step 712).

Afterward, the data processing system retrieves the physical record row identifier that was mapped to the selected logical record identifier within the logical record identifier index associated with the particular column of the data table that includes the data record having the particular key (step 714). Then, the data processing system uses the retrieved physical record row identifier that was mapped to the selected logical record identifier within the logical record identifier index associated with the particular column of the data table to fetch from the magnetic hard disk storage device the data record having the particular key in the data table (step 716). Further, the data processing system updates the data record having the particular key based on the received input to update the data record (step 718).

Subsequently, the data processing system changes a value associated with the particular column of the data table that includes the updated data record from a first value to a second value associated with the particular column (step 720). In addition, the data processing system places the updated data record in a location at an end of the data table (step 722). Furthermore, the data processing system determines a physical record row identifier corresponding to the location at the end of the data table where the updated data record was placed (step 724).

Then, the data processing system updates an entry in the logical record identifier to physical record row identifier indirection mapping table with the determined physical record row identifier corresponding to the location of the updated data record using the selected logical record identifier (step 726). The data processing system also traverses the logical record identifier index for the first value associated with the particular column to remove the entry corresponding to the data record having the particular key from the leaf page (step 728). In addition, the data processing system traverses the logical record identifier index for the second value associated with the particular column to insert an entry corresponding to the updated data record having the particular key within the leaf page (step 730). Thereafter, the process terminates.

Figure 8B:
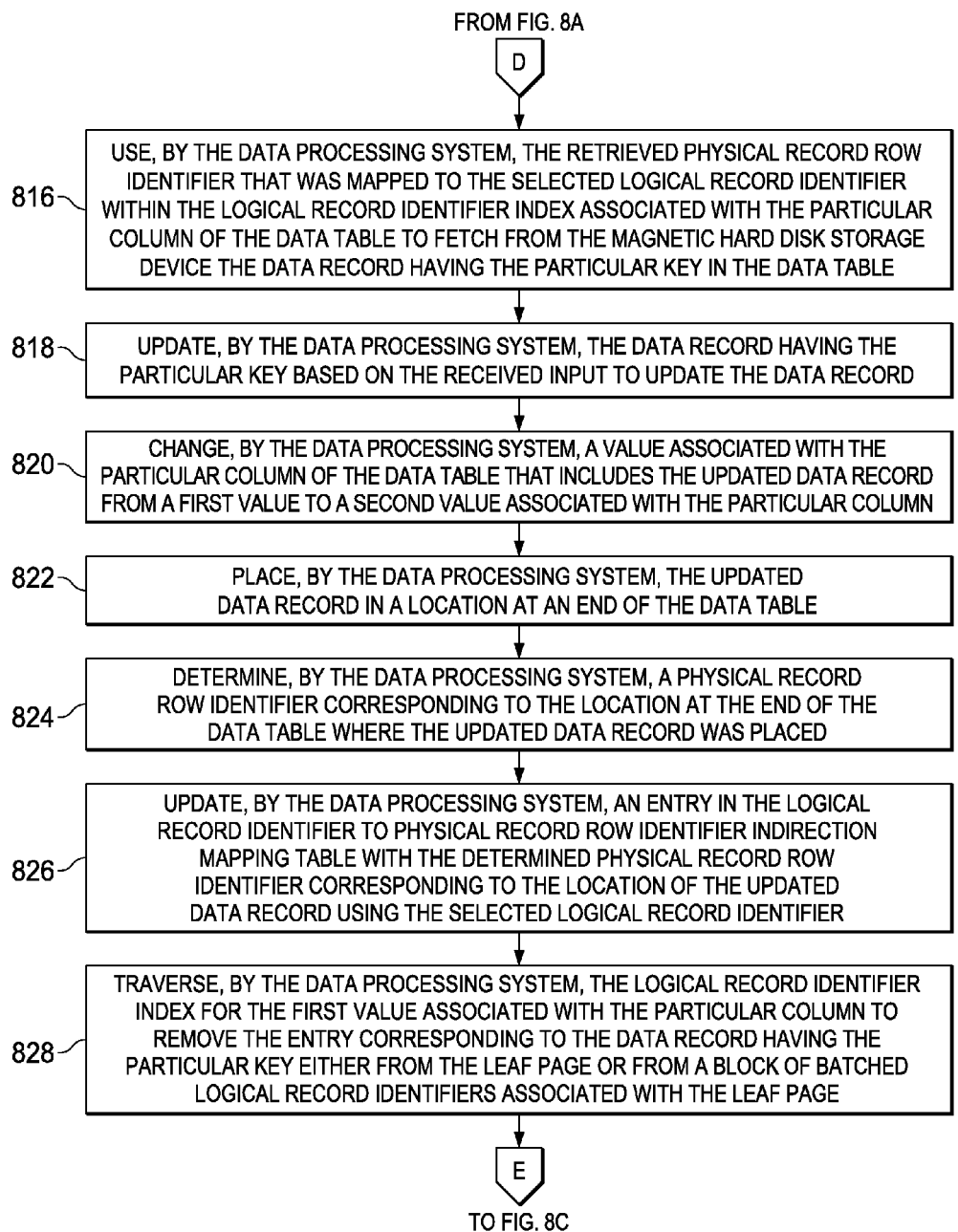
Figure 8C:
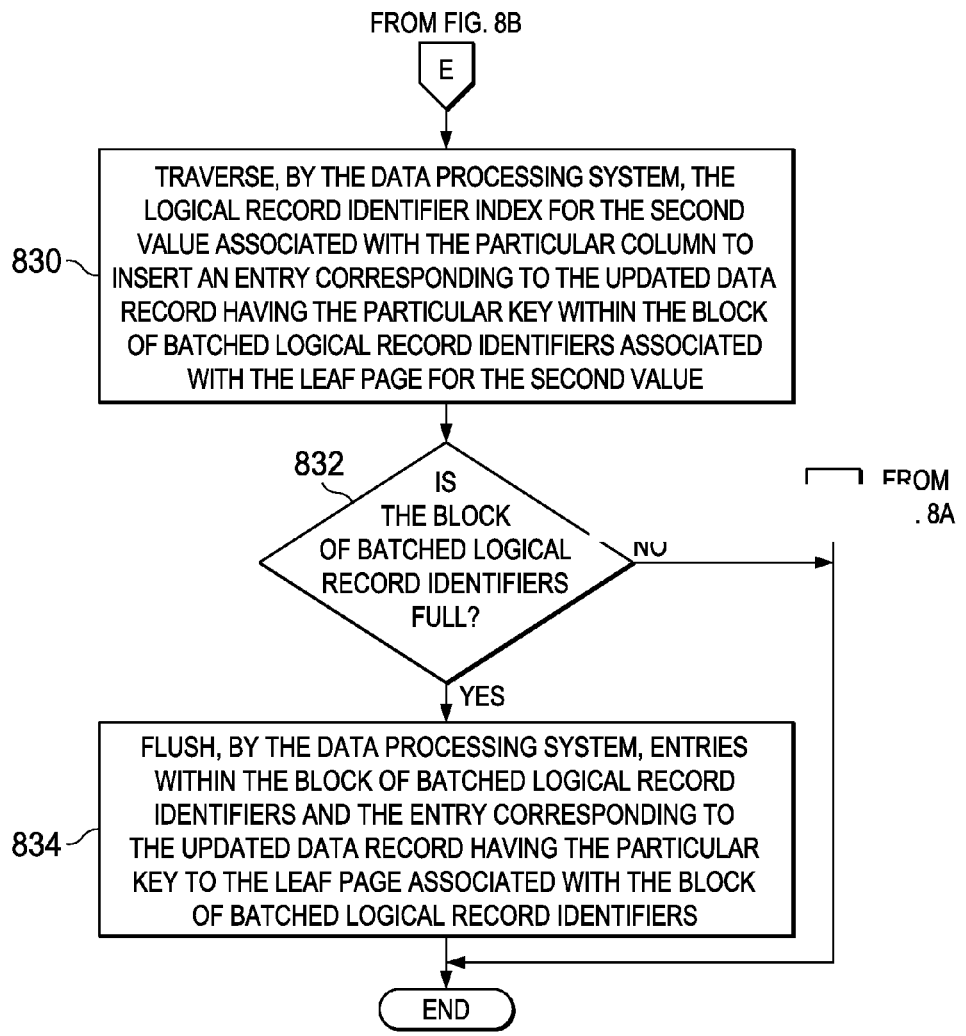

With reference now to FIGS. 8A-8C, a flowchart illustrating a process for updating data records in a relational data table using an indirection mapping table and blocks of batched logical record identifiers is shown in accordance with an illustrative embodiment. The process shown in FIGS. 8A-8C may be implemented in a data processing system, such as, for example, data processing system 100 in FIG. 1.

The process begins when the data processing system receives an input to update a data record having a particular key within a data table (step 802). Afterward, the data processing system searches a magnetic hard disk storage device for a primary key index associated with the data table (step 804). Then, the data processing system traverses the primary key index associated with the data table for an entry corresponding to the data record having the particular key (step 806). Subsequently, the data processing system makes a determination as to whether a leaf page within the primary key index associated with the data table includes an entry corresponding to the data record having the particular key (step 808).

If the data processing system determines that no leaf pages within the primary key index associated with the data table include an entry corresponding to the data record having the particular key, no output of step 808, then the process terminates thereafter. If the data processing system determines that a leaf page within the primary key index associated with the data table does include an entry corresponding to the data record having the particular key, yes output of step 808, then the data processing system selects a logical record identifier within a logical record identifier index associated with a particular column of the data table that includes the data record having the particular key (step 810). In addition, the data processing system maps the selected logical record identifier within the logical record identifier index associated with the particular column of the data table that includes the data record having the particular key to a physical record row identifier using a logical record identifier to physical record row identifier indirection mapping table stored in a solid-state storage device (step 812).

Afterward, the data processing system retrieves the physical record row identifier that was mapped to the selected logical record identifier within the logical record identifier index associated with the particular column of the data table that includes the data record having the particular key (step 814). Then, the data processing system uses the retrieved physical record row identifier that was mapped to the selected logical record identifier within the logical record identifier index associated with the particular column of the data table to fetch from the magnetic hard disk storage device the data record having the particular key in the data table (step 816). Further, the data processing system updates the data record having the particular key based on the received input to update the data record (step 818).

Subsequently, the data processing system changes a value associated with the particular column of the data table that includes the updated data record from a first value to a second value associated with the particular column (step 820). In addition, the data processing system places the updated data record in a location at an end of the data table (step 822). Furthermore, the data processing system determines a physical record row identifier corresponding to the location at the end of the data table where the updated data record was placed (step 824).

Then, the data processing system updates an entry in the logical record identifier to physical record row identifier indirection mapping table with the determined physical record row identifier corresponding to the location of the updated data record using the selected logical record identifier (step 826). Afterward, the data processing system traverses the logical record identifier index for the first value associated with the particular column to remove the entry corresponding to the data record having the particular key either from the leaf page or from a block of batched logical record identifiers associated with the leaf page (step 828). The data processing system also traverses the logical record identifier index for the second value associated with the particular column to insert an entry corresponding to the updated data record having the particular key within the block of batched logical record identifiers associated with the leaf page for the second value (step 830).

Subsequently, the data processing system makes a determination as to whether the block of batched logical record identifiers is full (step 832). If the data processing system determines that the block of batched logical record identifiers is not full, no output of step 832, then the process terminates thereafter. If the data processing system determines that the block of batched logical record identifiers is full, yes output of step 832, then the data processing system flushes entries within the block of batched logical record identifiers and the entry corresponding to the updated data record having the particular key to the leaf page associated with the block of batched logical record identifiers (step 834). Thereafter, the process terminates.

Figure 9:
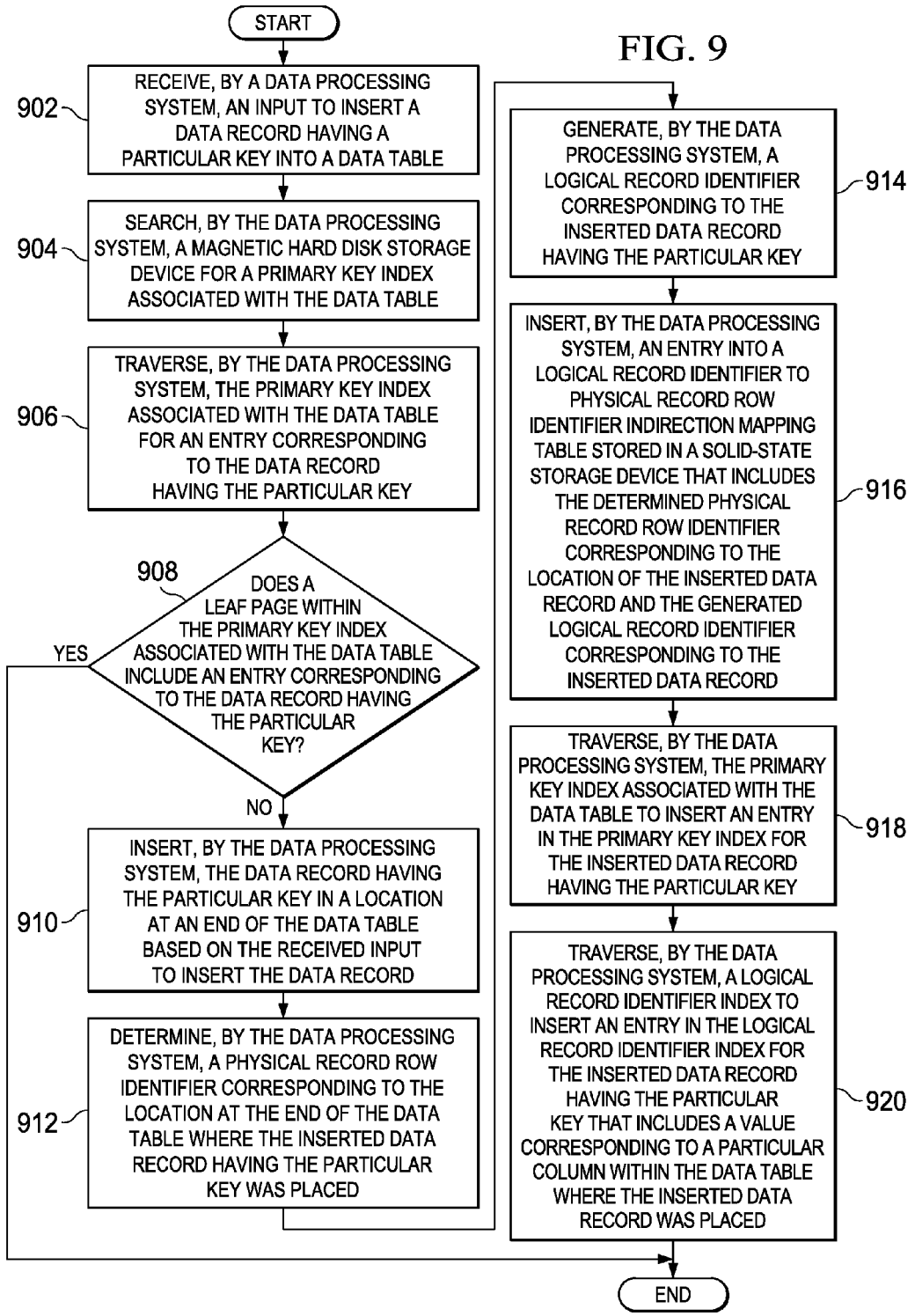
FIG. 9 is a flowchart illustrating a process for inserting data records in a relational data table using an indirection mapping table in accordance with an illustrative embodiment.

With reference now to FIG. 9, a flowchart illustrating a process for inserting data records in a relational data table using an indirection mapping table is shown in accordance with an illustrative embodiment. The process shown in FIG. 9 may be implemented in a data processing system, such as, for example, data processing system 100 in FIG. 1.

The process begins when the data processing system receives an input to insert a data record having a particular key into a data table (step 902). Afterward, the data processing system searches a magnetic hard disk storage device for a primary key index associated with the data table (step 904). Then, the data processing system traverses the primary key index associated with the data table for an entry corresponding to the data record having the particular key (step 906). Subsequently, the data processing system makes a determination as to whether a leaf page within the primary key index associated with the data table includes an entry corresponding to the data record having the particular key (step 908).

If the data processing system determines that a leaf page within the primary key index associated with the data table does include an entry corresponding to the data record having the particular key, yes output of step 908, then the process terminates thereafter. If the data processing system determines that no leaf pages within the primary key index associated with the data table include an entry corresponding to the data record having the particular key, no output of step 908, then the data processing system inserts the data record having the particular key in a location at an end of the data table based on the received input to insert the data record (step 910). In addition, the data processing system determines a physical record row identifier corresponding to the location at the end of the data table where the inserted data record having the particular key was placed (step 912).

Further, the data processing system generates a logical record identifier corresponding to the inserted data record having the particular key (step 914). The data processing system also inserts an entry into a logical record identifier to physical record row identifier indirection mapping table stored in a solid-state storage device that includes the determined physical record row identifier corresponding to the location of the inserted data record and the generated logical record identifier corresponding to the inserted data record (step 916). Then, the data processing system traverses the primary key index associated with the data table to insert an entry in the primary key index for the inserted data record having the particular key (step 918). In addition, the data processing system traverses a logical record identifier index to insert an entry in the logical record identifier index for the inserted data record having the particular key that includes a value corresponding to a particular column within the data table where the inserted data record was placed (step 920). Thereafter, the process terminates.

Figure 10B:
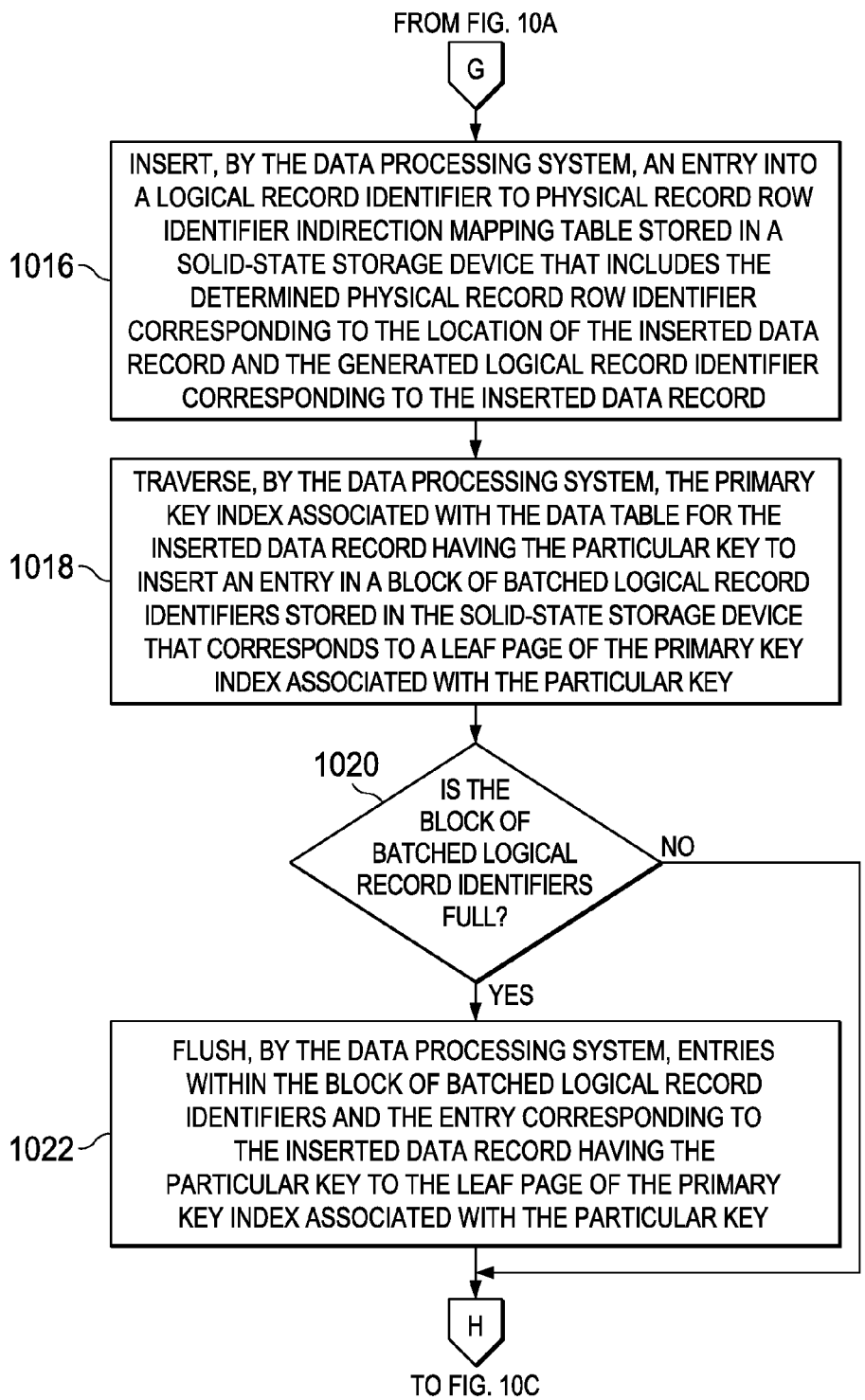
Figure 10C:
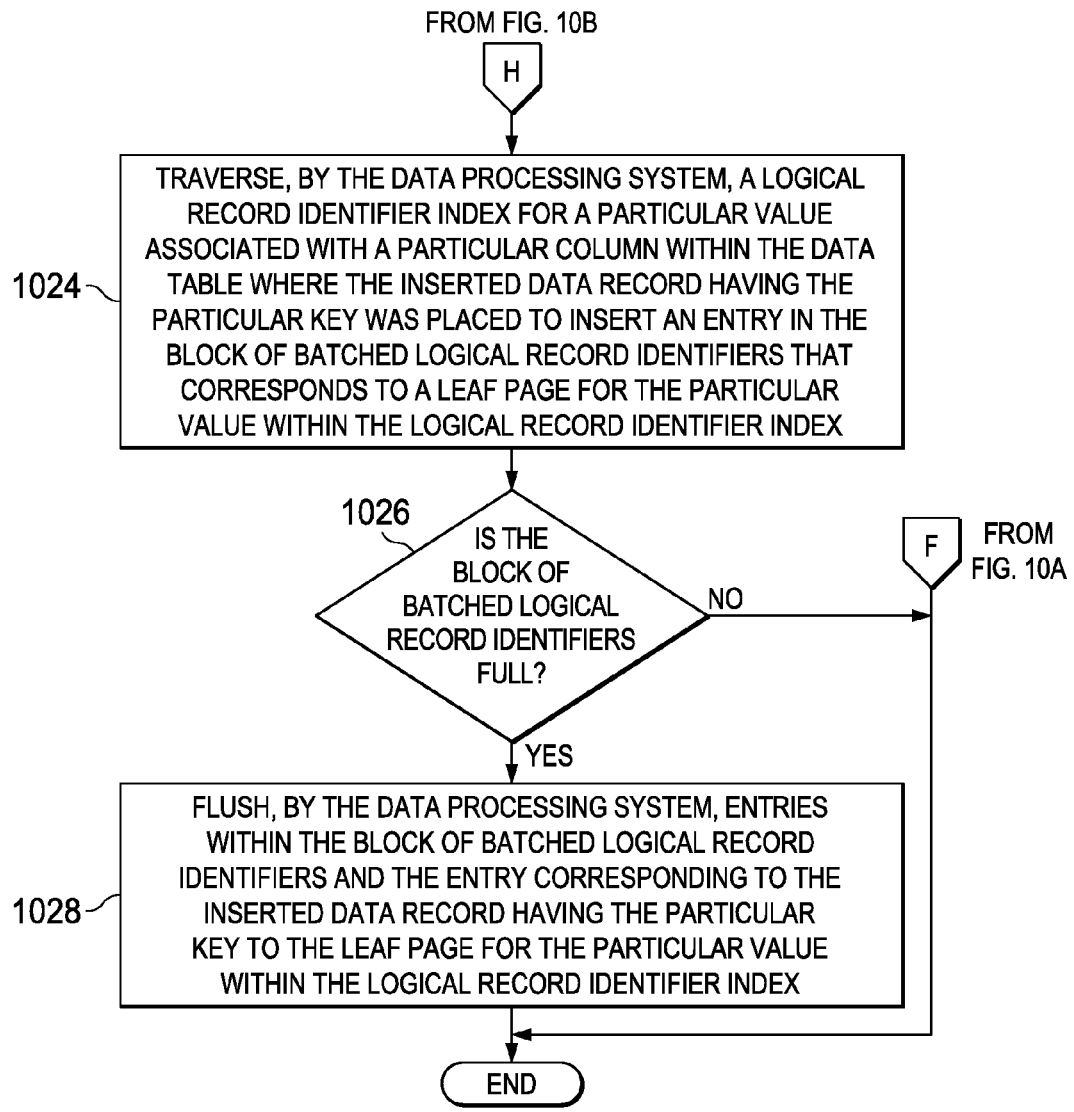

With reference now to FIGS. 10A-10C, a flowchart illustrating a process for inserting data records in a relational data table using an indirection mapping table and blocks of batched logical record identifiers is shown in accordance with an illustrative embodiment. The process shown in FIGS. 10A-10C may be implemented in a data processing system, such as, for example, data processing system 100 in FIG. 1.

The process begins when the data processing system receives an input to insert a data record having a particular key into a data table (step 1002). Afterward, the data processing system searches a magnetic hard disk storage device for a primary key index associated with the data table (step 1004). Then, the data processing system traverses the primary key index associated with the data table for an entry corresponding to the data record having the particular key (step 1006). Subsequently, the data processing system makes a determination as to whether a leaf page within the primary key index associated with the data table includes an entry corresponding to the data record having the particular key (step 1008).

If the data processing system determines that a leaf page within the primary key index associated with the data table does include an entry corresponding to the data record having the particular key, yes output of step 1008, then the process terminates thereafter. If the data processing system determines that no leaf pages within the primary key index associated with the data table include an entry corresponding to the data record having the particular key, no output of step 1008, then the data processing system inserts the data record having the particular key in a location at an end of the data table based on the received input to insert the data record (step 1010). In addition, the data processing system determines a physical record row identifier corresponding to the location at the end of the data table where the inserted data record having the particular key was placed (step 1012).

Further, the data processing system generates a logical record identifier corresponding to the inserted data record having the particular key (step 1014). The data processing system also inserts an entry into a logical record identifier to physical record row identifier indirection mapping table stored in a solid-state storage device that includes the determined physical record row identifier corresponding to the location of the inserted data record and the generated logical record identifier corresponding to the inserted data record (step 1016). Then, the data processing system traverses the primary key index associated with the data table for the inserted data record having the particular key to insert an entry in a block of batched logical record identifiers stored in the solid-state storage device that corresponds to a leaf page of the primary key index associated with the particular key (step 1018).

Afterward, the data processing system makes a determination as to whether the block of batched logical record identifiers is full (step 1020). If the data processing system determines that the block of batched logical record identifiers is not full, no output of step 1020, then the process proceeds to step 1024. If the data processing system determines that the block of batched logical record identifiers is full, yes output of step 1020, then the data processing system flushes entries within the block of batched logical record identifiers and the entry corresponding to the inserted data record having the particular key to the leaf page of the primary key index associated with the particular key (step 1022).

Subsequently, the data processing system traverses a logical record identifier index for a particular value associated with a particular column within the data table where the inserted data record having the particular key was placed to insert an entry in the block of batched logical record identifiers that corresponds to a leaf page for the particular value within the logical record identifier index (step 1024). Afterward, the data processing system makes a determination as to whether the block of batched logical record identifiers is full (step 1026). If the data processing system determines that the block of batched logical record identifiers is not full, no output of step 1026, then the process terminates thereafter. If the data processing system determines that the block of batched logical record identifiers is full, yes output of step 1026, then the data processing system flushes entries within the block of batched logical record identifiers and the entry corresponding to the inserted data record having the particular key to the leaf page for the particular value within the logical record identifier index (step 1028). Thereafter, the process terminates.

Figure 11A:
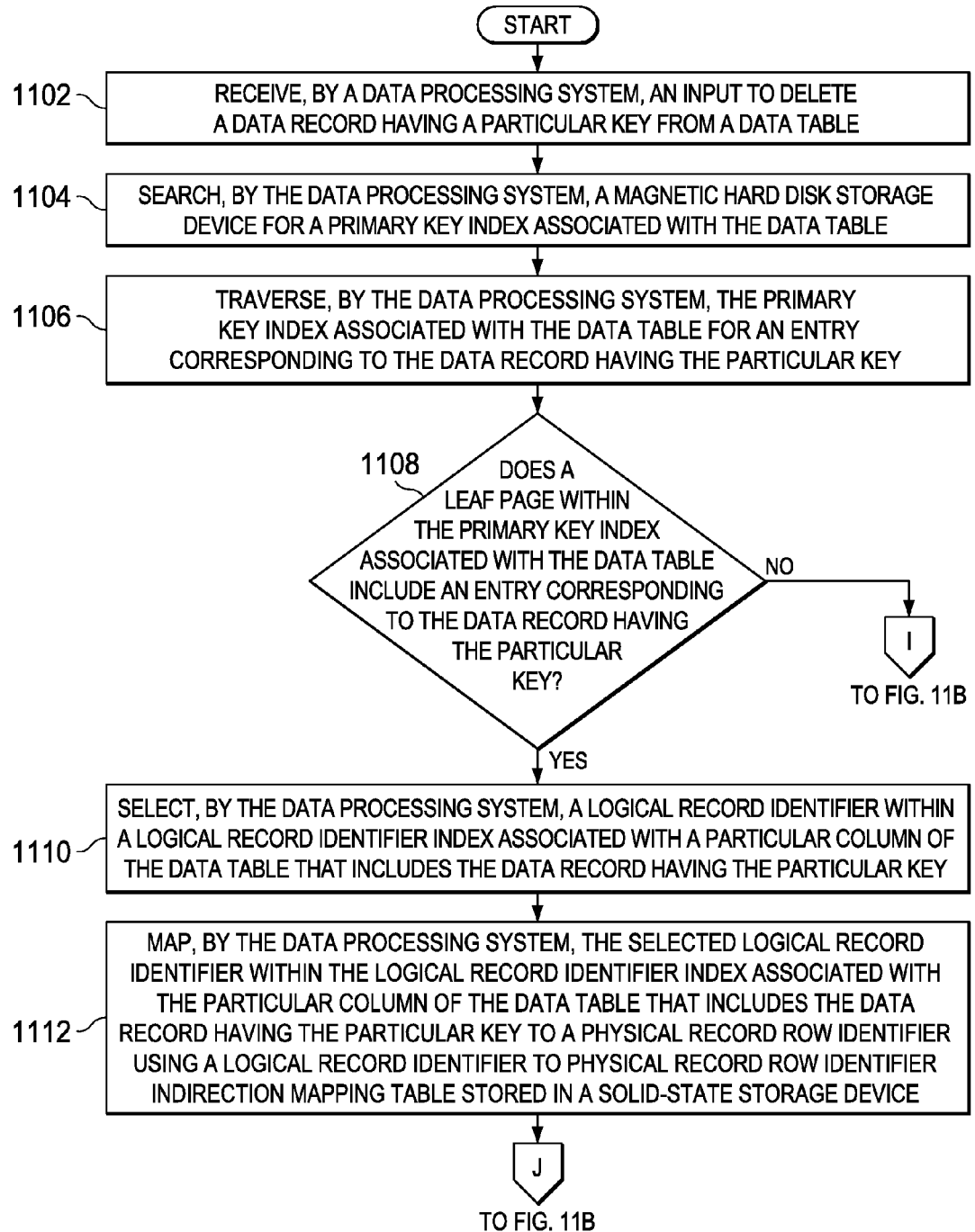
FIGS. 11A and 11B are a flowchart illustrating a process for deleting data records in a relational data table using an indirection mapping table in accordance with an illustrative embodiment.
Figure 11B:
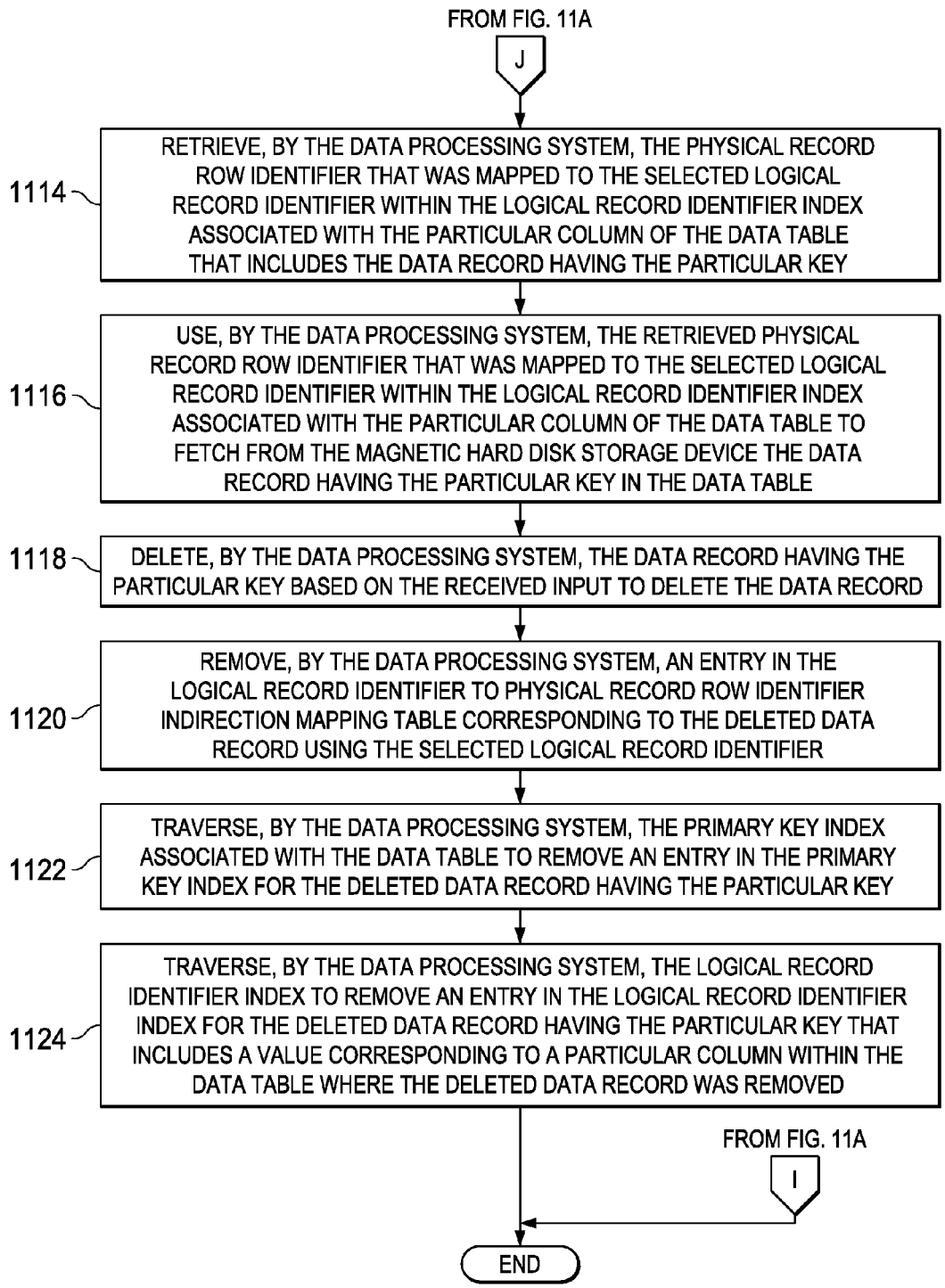

With reference now to FIGS. 11A and 11B, a flowchart illustrating a process for deleting data records in a relational data table using an indirection mapping table is shown in accordance with an illustrative embodiment. The process shown in FIGS. 11A-11B may be implemented in a data processing system, such as, for example, data processing system 100 in FIG. 1.

The process begins when the data processing system receives an input to delete a data record having a particular key from a data table (step 1102). Afterward, the data processing system searches a magnetic hard disk storage device for a primary key index associated with the data table (step 1104). Then, the data processing system traverses the primary key index associated with the data table for an entry corresponding to the data record having the particular key (step 1106). Subsequently, the data processing system makes a determination as to whether a leaf page within the primary key index associated with the data table includes an entry corresponding to the data record having the particular key (step 1108).

If the data processing system determines that no leaf pages within the primary key index associated with the data table include an entry corresponding to the data record having the particular key, no output of step 1108, then the process terminates thereafter. If the data processing system determines that a leaf page within the primary key index associated with the data table does include an entry corresponding to the data record having the particular key, yes output of step 1108, then the data processing system selects a logical record identifier within a logical record identifier index associated with a particular column of the data table that includes the data record having the particular key (step 1110). In addition, the data processing system maps the selected logical record identifier within the logical record identifier index associated with the particular column of the data table that includes the data record having the particular key to a physical record row identifier using a logical record identifier to physical record row identifier indirection mapping table stored in a solid-state storage device (step 1112).

The data processing system also retrieves the physical record row identifier that was mapped to the selected logical record identifier within the logical record identifier index associated with the particular column of the data table that includes the data record having the particular key (step 1114). Further, the data processing system uses the retrieved physical record row identifier that was mapped to the selected logical record identifier within the logical record identifier index associated with the particular column of the data table to fetch from the magnetic hard disk storage device the data record having the particular key in the data table (step 1116). Then, the data processing system deletes the data record having the particular key based on the received input to delete the data record (step 1118).

In addition, the data processing system removes an entry in the logical record identifier to physical record row identifier indirection mapping table corresponding to the deleted data record using the selected logical record identifier (step 1120).

Further, the data processing system traverses the primary key index associated with the data table to remove an entry in the primary key index for the deleted data record having the particular key (step 1122). The data processing system also traverses the logical record identifier index to remove an entry in the logical record identifier index for the deleted data record having the particular key that includes a value corresponding to a particular column within the data table where the deleted data record was removed (step 1124). Thereafter, the process terminates.

Figure 12A:
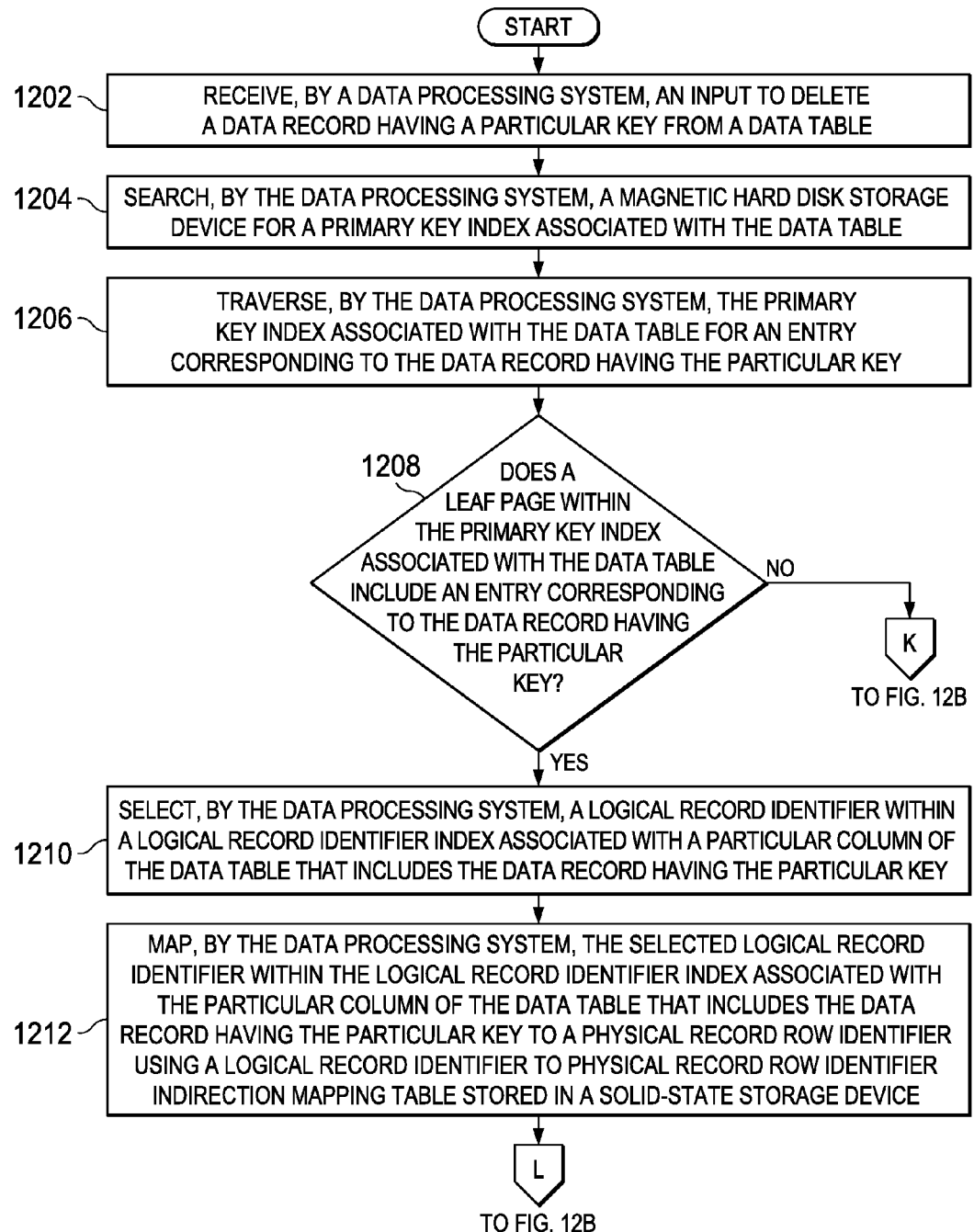
FIGS. 12A and 12B are a flowchart illustrating a process for deleting data records in a relational data table using an indirection mapping table and blocks of batched logical record identifiers in accordance with an illustrative embodiment.
Figure 12B:
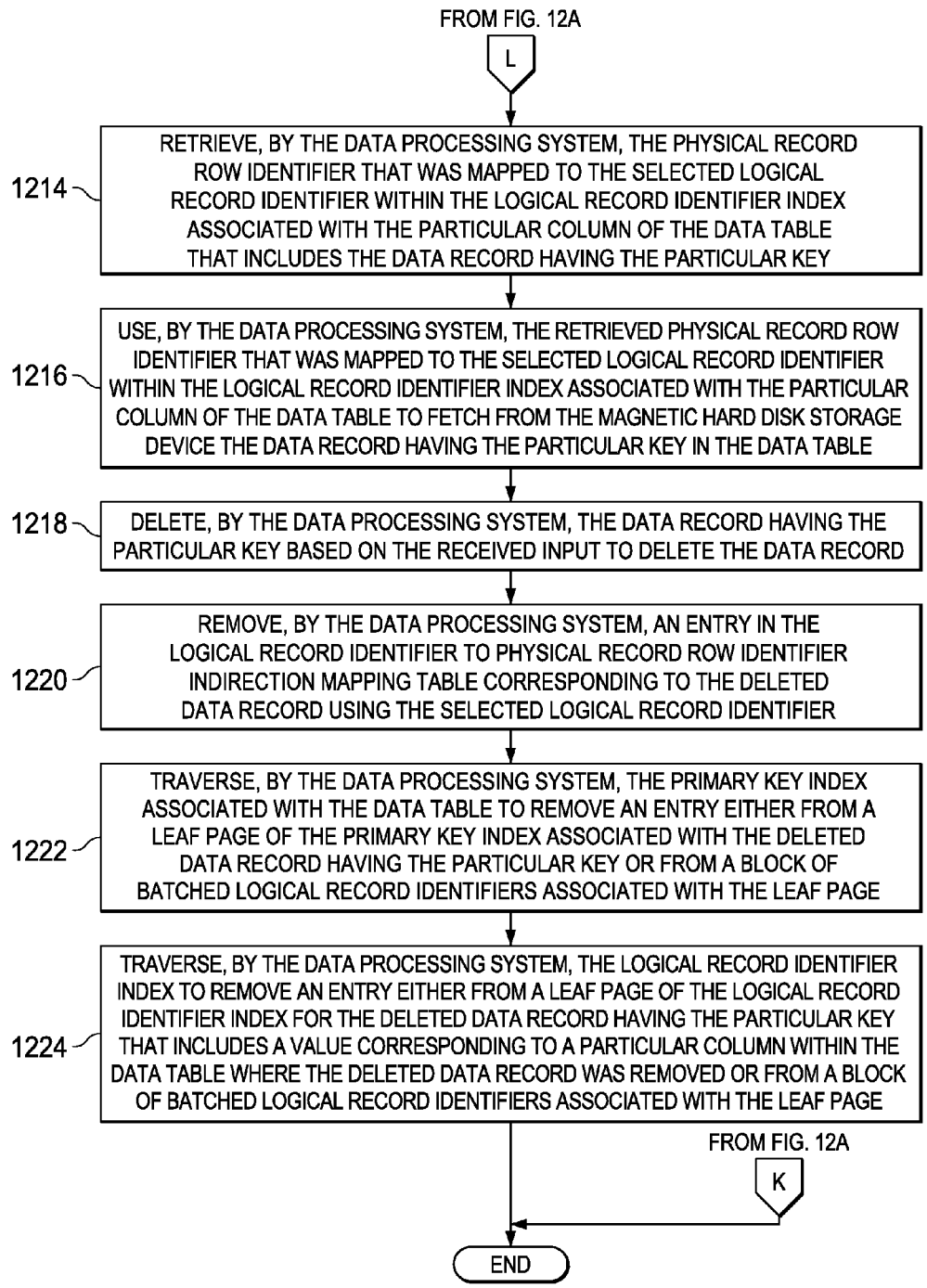

With reference now to FIGS. 12A and 12B, a flowchart illustrating a process for deleting data records in a relational data table using an indirection mapping table and blocks of batched logical record identifiers is shown in accordance with an illustrative embodiment. The process shown in FIGS. 12A-12B may be implemented in a data processing system, such as, for example, data processing system 100 in FIG. 1.

The process begins when the data processing system receives an input to delete a data record having a particular key from a data table (step 1202). Afterward, the data processing system searches a magnetic hard disk storage device for a primary key index associated with the data table (step 1204). Then, the data processing system traverses the primary key index associated with the data table for an entry corresponding to the data record having the particular key (step 1206). Subsequently, the data processing system makes a determination as to whether a leaf page within the primary key index associated with the data table includes an entry corresponding to the data record having the particular key (step 1208).

If the data processing system determines that no leaf pages within the primary key index associated with the data table include an entry corresponding to the data record having the particular key, no output of step 1208, then the process terminates thereafter. If the data processing system determines that a leaf page within the primary key index associated with the data table does include an entry corresponding to the data record having the particular key, yes output of step 1208, then the data processing system selects a logical record identifier within a logical record identifier index associated with a particular column of the data table that includes the data record having the particular key (step 1210). In addition, the data processing system maps the selected logical record identifier within the logical record identifier index associated with the particular column of the data table that includes the data record having the particular key to a physical record row identifier using a logical record identifier to physical record row identifier indirection mapping table stored in a solid-state storage device (step 1212).

The data processing system also retrieves the physical record row identifier that was mapped to the selected logical record identifier within the logical record identifier index associated with the particular column of the data table that includes the data record having the particular key (step 1214). Further, the data processing system uses the retrieved physical record row identifier that was mapped to the selected logical record identifier within the logical record identifier index associated with the particular column of the data table to fetch from the magnetic hard disk storage device the data record having the particular key in the data table (step 1216). Then, the data processing system deletes the data record having the particular key based on the received input to delete the data record (step 1218).

In addition, the data processing system removes an entry in the logical record identifier to physical record row identifier indirection mapping table corresponding to the deleted data record using the selected logical record identifier (step 1220).

Further, the data processing system traverses the primary key index associated with the data table to remove an entry either from a leaf page of the primary key index associated with the deleted data record having the particular key or from a block of batched logical record identifiers associated with the leaf page (step 1222). The data processing system also traverses the logical record identifier index to remove an entry either from a leaf page of the logical record identifier index for the deleted data record having the particular key that includes a value corresponding to a particular column within the data table where the deleted data record was removed or from a block of batched logical record identifiers associated with the leaf page (step 1224). Thereafter, the process terminates.

However, it should be noted that a similar logical record identifier batching technique described in the data record insertion process of FIG. 10 above, may be directly applicable to the data record deletion process described in FIG. 12. For example, during the deletion process the data processing system may batch all deleted logical record identifiers within a logical record identifier block structure, such as logical record identifier block 314 in FIG. 3, and periodically, flush and remove these logical record identifiers from the index leaf pages, such as leaf pages 310 in FIG. 3.

Thus, illustrative embodiments provide a computer program product and data processing system for managing different versions of a data record within a multi-version database. The descriptions of the various illustrative embodiments have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of computer systems, computer implemented methods, and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A data processing system for managing different versions of a data record, the data processing system comprising:
a bus system;
a computer readable storage device connected to the bus system, wherein the computer readable storage device stores computer readable program code; and
a processor unit connected to the bus system, wherein the processor unit executes the computer readable program code to maintain a mapping between a version-independent logical record identifier and a version-dependent physical record row identifier that correspond to each data record within a plurality of data records of a data table using a logical record identifier to physical record row identifier indirection mapping table; update entries within leaf pages of an index associated with the data table to point to the version-independent logical record identifier corresponding to a data record instead of pointing to the version-dependent physical record row identifier corresponding to the data record; and update the logical record identifier to physical record row identifier indirection mapping table in response to performing an operation on the data record instead of updating the entries within the leaf pages of the index associated with the data table.

2. The data processing system of claim 1, wherein the processor further executes the computer readable program code to keep only the version-dependent physical record row identifier that corresponds to a location of a most recent version of the data record within a plurality of versions for the data record in the data table in response to performing the operation on the data record.

3. The data processing system of claim 2, wherein the processor further executes the computer readable program code to update the mapping between the version-independent logical record identifier and the version-dependent physical record row identifier that correspond to the data record in the logical record identifier to physical record row identifier indirection mapping table using the version-dependent physical record row identifier corresponding to the location of the most recent version of the data record in the data table in response to performing the operation on the data record.

4. The data processing system of claim 1, wherein the processor further executes the computer readable program code to generate a null version-dependent physical record row identifier corresponding to the version-independent logical record identifier of the data record within the indirection mapping table without changing the entries within the leaf pages of the index associated with the data table in response to performing a deletion operation on the data record.

5. The data processing system of claim 1, wherein the physical record row identifier indirection mapping table is stored in a solid-state storage device of the data processing system, and wherein the data table and the index associated with the data table are stored in a magnetic hard disk storage device of the data processing system.

6. The data processing system of claim 1, wherein the version-independent logical record identifier identifies the data record without identifying a particular version of the data record.

7. The data processing system of claim 1, wherein the version-dependent physical record row identifier identifies a physical row location where a most recent version of the data record is stored within the data table.

8. The data processing system of claim 1, wherein the logical record identifier to physical record row identifier indirection mapping table maps one version-independent logical record identifier to one version-dependent physical record row identifier corresponding to the data record.

9. A computer program product stored on a computer readable storage device having computer readable program code encoded thereon that is executable by a data processing system for managing different versions of a data record, the computer program product comprising:
computer readable program code for maintaining a mapping between a version-independent logical record identifier and a version-dependent physical record row identifier that correspond to each data record within a plurality of data records of a data table using a logical record identifier to physical record row identifier indirection mapping table;

computer readable program code for updating entries within leaf pages of an index associated with the data table to point to the version-independent logical record identifier corresponding to a data record instead of pointing to the version-dependent physical record row identifier corresponding to the data record; and computer readable program code for updating the logical record identifier to physical record row identifier indirection mapping table in response to performing an operation on the data record instead of updating the entries within the leaf pages of the index associated with the data table.

10. The computer program product of claim 9, further comprising:

computer readable program code for keeping only the version-dependent physical record row identifier that corresponds to a location of a most recent version of the data record within a plurality of versions for the data record in the data table in response to performing the operation on the data record.

11. The computer program product of claim 10, further comprising:

computer readable program code for updating the mapping between the version-independent logical record identifier and the version-dependent physical record row identifier that correspond to the data record in the logical record identifier to physical record row identifier indirection mapping table using the version-dependent physical record row identifier corresponding to the location of the most recent version of the data record in the data table in response to performing the operation on the data record.

12. The computer program product of claim 9, further comprising:

computer readable program code for generating a null version-dependent physical record row identifier corresponding to the version-independent logical record identifier of the data record within the indirection mapping table without changing the entries within the leaf pages of the index associated with the data table in response to performing a deletion operation on the data record.

13. The computer program product of claim 9, wherein the physical record row identifier indirection mapping table is stored in a solid-state storage device of the data processing system, and wherein the data table and the index associated with the data table are stored in a magnetic hard disk storage device of the data processing system.

14. The computer program product of claim 9, wherein the version-independent logical record identifier identifies the data record without identifying a particular version of the data record.

15. The computer program product of claim 9, wherein the version-dependent physical record row identifier identifies a physical row location where a most recent version of the data record is stored within the data table.

16. The computer program product of claim 9, wherein the logical record identifier to physical record row identifier indirection mapping table maps one version-independent logical record identifier to one version-dependent physical record row identifier corresponding to the data record.

* * * * *